United States Patent
Iwata et al.

(10) Patent No.: US 10,464,255 B2
(45) Date of Patent: Nov. 5, 2019

(54) LIPOPHILIC LAMINATE, MANUFACTURING METHOD THEREFOR, AND ARTICLE

(71) Applicant: DEXERIALS CORPORATION, Tokyo (JP)

(72) Inventors: Ryosuke Iwata, Tochigi (JP); Shinobu Hara, Tochigi (JP); Mikihisa Mizuno, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/309,434

(22) PCT Filed: Apr. 9, 2015

(86) PCT No.: PCT/JP2015/061061
§ 371 (c)(1),
(2) Date: Nov. 7, 2016

(87) PCT Pub. No.: WO2015/170546
PCT Pub. Date: Nov. 12, 2015

(65) Prior Publication Data
US 2017/0151706 A1 Jun. 1, 2017

(30) Foreign Application Priority Data

May 9, 2014 (JP) ................. 2014-097767

(51) Int. Cl.
*G02B 1/16* (2015.01)
*G02B 1/10* (2015.01)
(Continued)

(52) U.S. Cl.
CPC .......... *B29C 59/16* (2013.01); *B29C 35/0805* (2013.01); *B29C 59/02* (2013.01);
(Continued)

(58) Field of Classification Search
CPC ... B29C 59/16; B29C 59/022; B29C 35/0805; B29C 59/02; B29C 2035/0822;
(Continued)

(56) References Cited

U.S. PATENT DOCUMENTS

| 5,747,152 A | 5/1998 | Oka et al. |
| 2008/0305305 A1 | 12/2008 | Sano et al. |

(Continued)

FOREIGN PATENT DOCUMENTS

| JP | 07-225302 A | 8/1995 |
| JP | 07-328532 A | 12/1995 |

(Continued)

OTHER PUBLICATIONS

Notice of Reasons for Rejection dated Oct. 24, 2017, for corresponding Japanese Patent Application No. JP 2014-097767. (With English Translation).

(Continued)

*Primary Examiner* — Nathan L Van Sell
(74) *Attorney, Agent, or Firm* — Pergament & Cepeda LLP; Milagros A. Cepeda; Edward D. Pergament

(57) ABSTRACT

The present invention provide a lipophilic laminate including a substrate and a lipophilic resin layer on the substrate, wherein the lipophilic resin layer has micro convex portions or micro concave portions in a surface thereof and contains filler particles, and when parts of the filler particles are exposed from the lipophilic resin layer, the rate of exposed portions of the filler particles relative to the surface of the lipophilic resin layer is 0.1% or more.

8 Claims, 15 Drawing Sheets

(51) Int. Cl.
| | |
|---|---|
| *B32B 7/04* | (2019.01) |
| *B32B 3/30* | (2006.01) |
| *B32B 27/42* | (2006.01) |
| *B32B 27/40* | (2006.01) |
| *B32B 27/38* | (2006.01) |
| *B32B 27/36* | (2006.01) |
| *B32B 27/34* | (2006.01) |
| *B32B 27/32* | (2006.01) |
| *B32B 27/30* | (2006.01) |
| *B32B 27/28* | (2006.01) |
| *B32B 23/20* | (2006.01) |
| *B32B 23/08* | (2006.01) |
| *B29C 59/16* | (2006.01) |
| *B29C 59/02* | (2006.01) |
| *B29C 35/08* | (2006.01) |
| *B32B 27/20* | (2006.01) |
| *G02B 1/18* | (2015.01) |
| *B32B 27/08* | (2006.01) |
| *B29K 33/04* | (2006.01) |
| *B29L 9/00* | (2006.01) |

(52) U.S. Cl.
CPC .............. *B29C 59/022* (2013.01); *B32B 3/30* (2013.01); *B32B 7/04* (2013.01); *B32B 23/08* (2013.01); *B32B 23/20* (2013.01); *B32B 27/08* (2013.01); *B32B 27/20* (2013.01); *B32B 27/28* (2013.01); *B32B 27/281* (2013.01); *B32B 27/285* (2013.01); *B32B 27/286* (2013.01); *B32B 27/302* (2013.01); *B32B 27/304* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B32B 27/38* (2013.01); *B32B 27/40* (2013.01); *B32B 27/42* (2013.01); *G02B 1/10* (2013.01); *G02B 1/18* (2015.01); *B29C 2035/085* (2013.01); *B29C 2035/0822* (2013.01); *B29C 2035/0827* (2013.01); *B29C 2035/0833* (2013.01); *B29C 2035/0838* (2013.01); *B29C 2035/0844* (2013.01); *B29C 2035/0855* (2013.01); *B29C 2035/0861* (2013.01); *B29C 2035/0872* (2013.01); *B29C 2059/023* (2013.01); *B29K 2033/04* (2013.01); *B29L 2009/005* (2013.01); *B32B 2250/02* (2013.01); *B32B 2250/03* (2013.01); *B32B 2250/24* (2013.01); *B32B 2255/10* (2013.01); *B32B 2255/26* (2013.01); *B32B 2307/538* (2013.01); *B32B 2307/728* (2013.01); *B32B 2307/73* (2013.01); *B32B 2307/746* (2013.01); *B32B 2419/00* (2013.01); *B32B 2457/208* (2013.01); *B32B 2551/08* (2013.01); *B32B 2605/006* (2013.01)

(58) Field of Classification Search
CPC ...... B29C 2035/0872; B29C 2059/023; B29C 2035/0827; B29C 2035/0861; B29C 2035/0855; B29C 2035/085; B29C 2035/0844; B29C 2035/0838; B29C 2035/0833; G02B 1/18; G02B 1/10; B32B 27/20; B32B 3/30; B29L 2009/005; B29K 2033/04
See application file for complete search history.

(56) References Cited

U.S. PATENT DOCUMENTS

| | | | |
|---|---|---|---|
| 2010/0033818 A1* | 2/2010 | Petcavich | B08B 17/06 359/507 |
| 2010/0076211 A1 | 3/2010 | Yamane et al. | |
| 2012/0088092 A1* | 4/2012 | Simpson | B05D 5/08 428/323 |
| 2012/0212825 A1 | 8/2012 | Nomura et al. | |
| 2014/0126064 A1* | 5/2014 | Kishi | G02B 5/0278 359/601 |

FOREIGN PATENT DOCUMENTS

| | | |
|---|---|---|
| JP | 2007-331136 A | 12/2007 |
| JP | 2010-128363 A | 6/2010 |
| JP | 2010-132839 A | 6/2010 |
| JP | 2010-284843 A | 12/2010 |
| JP | 4666667 B2 | 4/2011 |
| JP | 2012-163723 A | 8/2012 |
| JP | 2015-075711 A | 4/2015 |
| WO | 2015/053272 A1 | 4/2015 |

OTHER PUBLICATIONS

Written Opinion dated Jul. 14, 2015, for corresponding International Patent Application No. PCT/JP2015/061061.
International Preliminary Report on Patentability dated Jun. 24, 2016, for corresponding International Patent Application No. PCT/JP2015/061061. (English Translation).

* cited by examiner

LIPOPHILIC LAMINATE, MANUFACTURING METHOD THEREFOR, AND ARTICLE

This application is a National Phase application under 35 U.S.C. 371 of International Application No. PCT/JP2015/061061, filed on Apr. 9, 2015, which claims priority to Japanese provisional application No. 2014-097767, filed on May. 9, 2014, all of which are hereby incorporated by references in their entireties.

TECHNICAL FIELD

The present invention relates to a lipophilic laminate, a method for producing the lipophilic laminate, and an article using the lipophilic laminate.

BACKGROUND ART

When fingerprints are deposited on surfaces of articles, the articles are aesthetically deteriorated. For example, when fingerprints are deposited on surfaces of pianos, high quality furniture, household electric appliances, or automobile interior and exterior parts, they are aesthetically deteriorated and become unseemly.

Additionally, when fingerprints are deposited on surfaces of articles, the articles are deteriorated in optical properties (e.g., visibility). For example, touch panels of information displays (e.g., smartphones or tablet PCs) that are equipped with the touch panels as user interfaces (UI) have an advantage of capable of being intuitively operated by directly touching display screens with fingers. However, when fingerprints are deposited on the touch panels, the screen is deteriorated in visibility.

The surface of articles are required to have fingerprint resistance in which fingerprints are less likely to be deposited on the surfaces or are inconscicuous even when the fingerprints are deposited on the surface.

In view of this, for example, there have been proposed, as the display screens (e.g., touch panels), antifouling layers of which the outermost surfaces are formed of fluorine compounds or silicone compounds (see, for example, Japanese Patent (JP-B) No. 4666667). In this proposed technique, formation of water- and oil-repellent surfaces weaken adhesive force of oil components contained in the fingerprints, which allows the fingerprints to be easily wiped-off with, for example, a cloth.

There have also been proposed water-repellent, lipophilic surfaces which do not repel oil components (see, for example, Japanese Patent Application Laid-Open (JP-A) No. 2010-128363). In this proposed technique, oil components contained in fingerprints deposited on the surfaces spread and thus do not form liquid droplets, which allows the fingerprints to be inconspicuous.

There have also been proposed optical elements having microstructured surfaces in order to allow the fingerprints to be easily wiped-off (see, for example, JP-A No. 2012-163723).

Because the articles are used for various applications under various environments, laminates which are attached onto surfaces of the articles to serve as antifouling layers are required to have good long-term fingerprint resistance. In addition to the fingerprint resistance, the laminates are also required to have a pleasant feel to the touch of users.

However, these conventionally proposed techniques are unsatisfactory in terms of the long-term fingerprint resistance and the pleasant feel in use, so that they have a room for improvement.

Therefore, there is a need to provide a lipophilic laminate having excellent fingerprint resistance even for long-term use and achieving a pleasant feel to the touch for users; a method for producing the lipophilic laminate; and an article using the lipophilic laminate.

SUMMARY OF THE INVENTION

Technical Problem

The present invention aims to solve the above existing problems and achieve the following object. That is, the present invention has an object to provide a lipophilic laminate having excellent fingerprint resistance even for long-term use and achieving a pleasant feel to the touch for users; a method for producing the lipophilic laminate; and an article using the lipophilic laminate.

Solution to Problem

The means for solving the above-described problems are as follows.

In one aspect, the present invention provides a lipophilic laminate including:
a substrate; and
a lipophilic resin layer on the substrate,
wherein the lipophilic resin layer has micro convex portions or micro concave portions in a surface thereof,
wherein the lipophilic resin layer contains filler particles,
wherein parts of the filler particles are exposed from the lipophilic resin layer, and
wherein a rate of exposed portions of the filler particles relative to the surface of the lipophilic resin layer is 0.1% or more.
In one variant, the present invention provides the lipophilic laminate according to the present invention, wherein the lipophilic resin layer contains 1by mass to 30% by mass of filler particles having an average particle diameter of less than 200 µm.
In one variant, the present invention provides the lipophilic laminate according to the present invention, wherein the filler particles include at least one of organic particles, inorganic particles, and organic-inorganic hybrid particles.
In one variant, the present invention provides the lipophilic laminate according to the present invention, wherein the filler particles are exposed from the surface of the lipophilic resin layer by a height a (µm) of 0.1 µm to 29 µm.
In one variant, the present invention provides the lipophilic laminate according to the present invention, wherein a ratio a/L is 0.01 to 0.67 where a (µm) denotes an exposed height of the filler particles exposed from the surface of the lipophilic resin layer and L (µm) denotes an average thickness of the lipophilic resin layer.
In one variant, the present invention provides the lipophilic laminate according to the present invention, wherein a ratio a/X is 2 to 200 where a (µm) denotes an exposed height of the filler particles exposed from the surface of the lipophilic resin layer and X (µm) denotes an average height of the micro convex portions or an average depth of the micro concave portions in the lipophilic resin layer.
In another aspect, the present invention provides a method for producing the lipophilic laminate according to the present invention, the method including:

coating a substrate with an active-energy-ray curable resin-composition containing filler particles to form an uncured resin layer; and forming a lipophilic resin layer by applying pressure to the uncured resin layer with being in close contact with a transfer matrix having micro convex portions or micro concave portions to form a geometry of the micro convex portions or the micro concave portions in the uncured resin layer, removing the pressure, and curing the uncured resin layer by irradiating the uncured resin layer with an active energy ray with keeping the geometry of the micro convex portions or the micro concave portions to thereby transfer the micro convex portions or the micro concave portions.

In one variant, the present invention provides the method for producing the lipophilic laminate according to the present invention, wherein the micro convex portions or the micro concave portions in the transfer matrix are formed by etching a surface of the transfer matrix with a photoresist having a predetermined geometry pattern and serving as a protective film.

In one variant, the present invention provides the method for producing the lipophilic laminate according to the present invention, wherein the micro convex portions or the micro concave portions in the transfer matrix are formed by irradiating a surface of the transfer matrix with laser to laser-process the transfer matrix.

In yet another aspect, the present invention provides an article including the lipophilic laminate according to the present invention in a surface thereof.

Advantageous Effects of the Invention

The present invention can solve the above existing problems and achieve the above object. That is, the present invention can provide a lipophilic laminate having excellent fingerprint resistance even for long-term use and achieving a pleasant feel to the touch for users; a method for producing the lipophilic laminate; and an article using the lipophilic laminate.

DESCRIPTION OF EMBODIMENTS (Lipophilic Laminate)

Figure 1A:
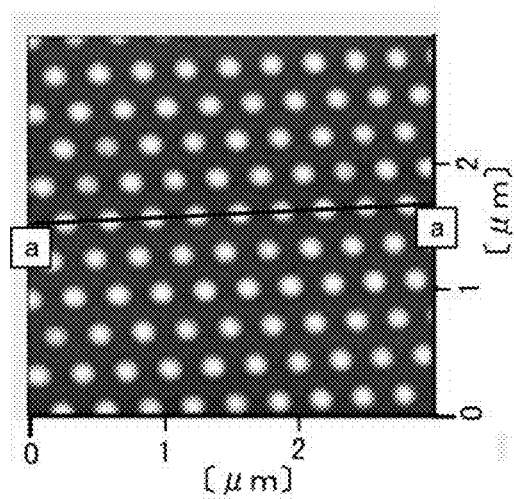
FIG. 1A is an atomic force microscope (AFM) image illustrating one exemplary surface of a lipophilic resin layer having convex portions.

A lipophilic laminate of the present invention includes at least a substrate and a lipophilic resin layer; and, if necessary, further includes other members.

The lipophilic resin layer includes micro convex portions or the micro concave portions in a surface thereof.

The lipophilic resin layer includes filler particles.

Parts of the filler particles are exposed from the lipophilic resin layer. A rate of exposed portions of the filler particles relative to the surface of the lipophilic resin layer is 0.1% or more.

<Substrate>

A material of the substrate is not particularly limited and may be appropriately selected depending on the intended purpose. Examples of the material include triacetylcellulose (TAC), polyester (TPEE), polyethylene terephthalate (PET), polyethylenenaphthalate (PEN), polyimide (PI), polyamide (PA), aramid, polyethylene (PE), polyacrylate, polyethersulfone, polysulfone, polypropylene (PP), polystyrene, diacetylcellulose, polyvinyl chloride, polymethyl methacrylate (PMMA), polycarbonate (PC), epoxy resins, urea resins, urethane resins, melamine resins, phenolic resins, acrylonitrile-butadiene-styrene copolymers, cycloolefin polymers (COP), cycloolefin copolymers (COC), PC/PMMA laminates, and rubber-added PMMA.

The substrate is preferably a substrate made of a resin.

The substrate is preferably transparent.

A shape of the substrate is not particularly limited and may be appropriately selected depending on the intended purpose, but the substrate is preferably film-shaped.

When the substrate is film-shaped, an average thickness of the substrate is not particularly limited and may be appropriately selected depending on the intended purpose, but is preferably 5 μm to 1,000 μm, more preferably 50 μm to 500 μm.

The substrate is preferably a triacetylcellulose (TAC) film, a polyethylene terephthalate (PET) film, a polycarbonate (PC) film, a polymethyl methacrylate (PMMA) film, and a PC/PMMA laminate, more preferably a polyethylene terephthalate (PET) film.

On the surface of the substrate, for example, letters, patterns, or images may be printed.

On the surface of the substrate, a binder layer may be provided in order to bring the substrate into closer contact with a molding material during a molding process of the lipophilic laminate or in order to protect the letters, the patterns, and the images from flow pressure of the molding material during a molding process. As a material for the binder layer, various binders such as acrylic binders, urethane binders, polyester binders, polyamide binders, ethylene butyl alcohol binders, and ethylene-vinyl acetate copolymer binders; and various adhesives can be used. Note that, two or more binder layers may be provided. A heat-sensitive and pressure-sensitive binder suitable for a molding material can be selected and used.

<Lipophilic Resin Layer>

The lipophilic resin layer has micro convex portions or micro concave portions in a surface thereof.

The lipophilic resin layer contains filler particles.

Parts of the filler particles are exposed from the lipophilic resin layer, and a rate of exposed portions of the filler particles relative to the surface of the lipophilic resin layer is 0.1% or more.

The lipophilic resin layer is formed on the substrate.

The lipophilic resin layer is not particularly limited and may be appropriately selected depending on the intended purpose, but preferably contains a cured product of an active-energy-ray curable resin-composition.

An average thickness of the lipophilic resin layer is not particularly limited and may be appropriately selected depending on the intended purpose, but is preferably 0.1 μm to 100 μm, more preferably 1 μm to 20 μm. The average thickness of the lipophilic resin layer is preferably adjusted taking into account a balance among a kind, an average particle diameter, or a content of filler particles described below.

An average thickness L (μm) of the lipophilic resin layer can be measured in the following manner.

[Measurement of Average Thickness L (μm) of Lipophilic Resin Layer]

A reflection spectrum of a sample is measured using a film thickness measurement system F20 (available from Filmetrics Japan, Inc.). Then, a film thickness is calculated from the reflection spectrum using a film thickness measurement software FILMEASURE (Ver. 2.4.3) (available from Filmetrics Japan, Inc.).

<<Micro Convex Portion and Micro Concave Portion>>

The lipophilic resin layer has micro convex portions or micro concave portions in a surface thereof.

The micro convex portions or the micro concave portions are formed in a surface of the lipophilic resin layer opposite to a surface facing the substrate.

As used herein, the micro convex portions refer to those formed in a surface of the lipophilic resin layer and having an average distance between convex portions adjacent to each other of 1,000 nm or less.

As used herein, the micro concave portions refer to those formed in a surface of the lipophilic resin layer and having an average distance between concave portions adjacent to each other of 1,000 nm or less.

Shapes of the convex portions and the concave portions are not particularly limited and may be appropriately selected depending on the intended purpose. Examples of the shapes include a cone shape, a columnar shape, a needle shape, a partially spherical shape (for example, semispherical shape), a partially ellipsoidal shape (for example, semi-ellipsoidal shape), and a polygonal shape. These shapes do not necessarily completely satisfy mathematical definitions and may be distorted to some extent.

The convex portions or the concave portions are two-dimensionally disposed in the surface of the lipophilic resin layer. The convex portions or the concave portions may be regularly or randomly disposed. In the case where the convex portions or the concave portions are regularly disposed, they are preferably close-packed from the viewpoint of a filling rate.

An average distance between convex portions adjacent to each other is not particularly limited and may be appropriately selected depending on the intended purpose, but is preferably 5 nm to 1,000 nm, more preferably 10 nm to 800 nm, further preferably 10 nm to 500 nm, particularly preferably 50 nm to 500 nm.

An average distance between concave portions adjacent to each other is not particularly limited and may be appropriately selected depending on the intended purpose, but is preferably 5 nm to 1,000 nm, more preferably 10 nm to 800 nm, further preferably 10 nm to 500 nm, particularly preferably 50 nm to 500 nm.

When the average distance between convex or concave portions adjacent to each other falls within the above preferable range, a fingerprint component deposited onto the lipophilic resin layer effectively gets wet and spreads, and a fingerprint wiping-off property is improved. When the average distance between convex or concave portions adjacent to each other falls within the above particularly preferable range, a fingerprint component significantly effectively gets wet and spreads, and a fingerprint wiping-off property is significantly improved.

An average height of the convex portions is not particularly limited and may be appropriately selected depending on the intended purpose, but is preferably 1 nm to 1,000 nm, more preferably 5 nm to 500 nm, further preferably 10 nm to 300 nm, particularly preferably 10 nm to 150 nm.

An average depth of the concave portions is not particularly limited and may be appropriately selected depending on the intended purpose, but is preferably 1 nm to 1,000 nm, more preferably 5 nm to 500 nm, further preferably 10 nm to 300 nm, particularly preferably 10 nm to 150 nm.

When the average height of the convex portions or the average depth of the concave portions falls within the above preferable range, a fingerprint component deposited onto the lipophilic resin layer effectively gets wet and spreads, and a fingerprint wiping-off property is improved. When the average height of the convex portions or the average depth of the concave portions falls within the above particularly preferable range, a fingerprint component significantly effectively gets wet and spreads, and a fingerprint wiping-off property is significantly improved.

An average aspect ratio of the convex portions (the average height of the convex portions/the average distance between convex portions adjacent to each other) or an average aspect ratio of the concave portions (the average depth of the concave portions/the average distance between concave portions adjacent to each other) is not particularly limited and may be appropriately selected depending on the intended purpose, but is preferably 0.001 to 1,000, more preferably 0.01 to 50, particularly preferably 0.04 to 3.0.

When the average aspect ratio of the convex portions or the average aspect ratio of the concave portions falls within the above preferable range, a fingerprint component deposited onto the lipophilic resin layer effectively gets wet and spreads, and a fingerprint wiping-off property is improved. When the average aspect ratio falls within the above particularly preferable range, a fingerprint component significantly effectively gets wet and spreads, and a fingerprint wiping-off property is significantly improved.

The average distance (Pm) between convex or concave portions, and the average height of convex portions or the average depth of concave portions (Hm: hereinafter may be referred to as "X") can be determined in the following manner.

Note that, X denotes the average height of the convex portions or the average depth of concave portions in the same manner as for Hm, except that a unit of Hm (nm) is converted to μm (Hm(nm)=X(μm)) in order to calculate a value of a/X described below.

[Measurement of Pm (nm) and Hm (nm)]

First, a surface S of the lipophilic resin layer having convex portions or concave portions is observed by an atomic force microscope (AFM). From a cross-sectional profile of the resultant AFM image, a pitch of the convex portions or the concave portions, and a height of the convex portion or a depth of the concave portion are determined. This procedure is repeated at randomly selected 10 positions on the surface of the lipophilic resin layer to thereby determine the pitches P1, P2, . . . , P10 and the heights or the depths H1, H2, . . . , H10.

As used herein, the pitch of the convex portions refers to a distance between peaks of the convex portions, and the pitch of the concave portions refers to a distance between the deepest points of the concave portions. As used herein, the height of the convex portion refers to a height of the convex portion based on the lowest point of a valley portion between the convex portions, and the depth of the concave portion refers to a depth of the concave portion based on the highest point of a mountain portion between the concave portions.

Then, the pitches P1, P2, . . . , P10 and the heights or the depths H1, H2, . . . , H10 are simply averaged (arithmetically averaged) to determine the average distance (Pm) between convex or concave portions, and the average height of convex portions or the average depth of concave portions (Hm).

Note that, when the pitch of the convex or concave portion has in-plane anisotropy, a pitch in a direction giving a maximum pitch value is used to determine the Pm. When the height of the convex portion or the depth of the concave portion has in-plane anisotropy, the height or depth in the direction giving a maximum height or depth value is used to determine Hm.

When the convex or concave portions have rod shapes, the pitch in a minor axis direction is determined as the pitch.

Note that, when the convex or concave portions are observed by AFM, in order to confirm a convex peak or a concave base in a cross-sectional profile to a peak of the convex portion or the deepest portion of the concave portion in a three-dimensional geometry, the cross-sectional profile is taken through the peak of the convex portion or the deepest portion of the concave portion in the three-dimensional geometry to be measured.

Whether microstructures formed in the surface of the lipophilic resin layer are convex or concave can be determined in the following manner.

A surface S of the lipophilic resin layer having convex portions or concave portions is observed by an atomic force microscope (AFM) to obtain AFM images of a cross-section and the surface S.

The AFM image of the surface is set so that the uppermost side is brighter and the deepest side is darker. When a bright image is formed like an island in a dark image, the surface is determined to have a convex portion.

Conversely, when a dark image is formed like an island in a bright image, the surface is determined to have a concave portion.

Figure 1B:
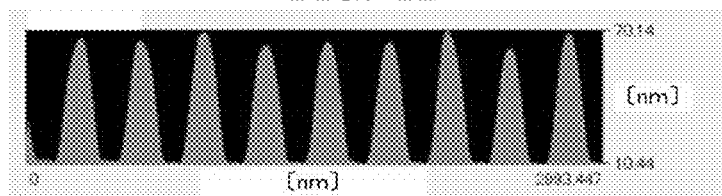
FIG. 1B is a cross-sectional view taken through the a-a line in FIG. 1A.
Figure 2A:
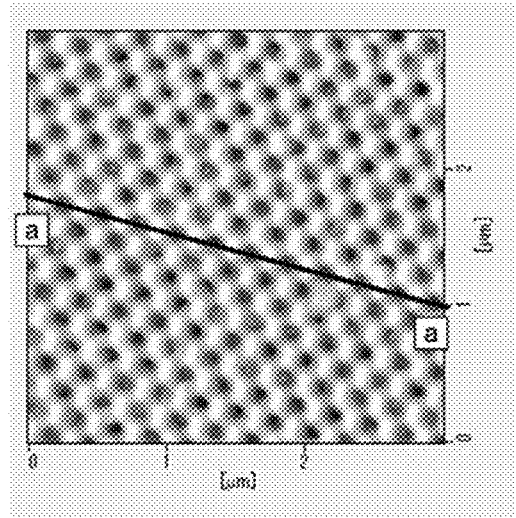
FIG. 2A is an AFM image illustrating one exemplary surface of a lipophilic resin layer having concave portions.
Figure 2B:
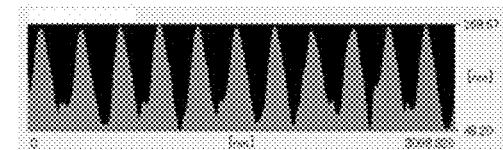
FIG. 2B is a cross-sectional view taken through the a-a line in FIG. 2A.

For example, a surface of a lipophilic resin layer of which AFM images of a surface and a cross-section are illustrated in FIG. 1A and FIG. 1B has convex portions. A surface of a lipophilic resin layer of which AFM images of a surface and a cross-section illustrated in FIG. 2A and FIG. 2B has concave portions.

The convex or concave portions adjacent to each other are preferably spaced from each other. An average distance of space (average space distance) between the convex or concave portions adjacent to each other is not particularly limited and may be appropriately selected depending on the intended purpose, but is preferably 1 nm to 999 nm, more preferably 5 nm to 795 nm, further preferably 10 nm to 490 nm, particularly preferably 100 nm to 190 nm. When the average space distance falls within the above preferable range, a fingerprint component deposited onto the lipophilic resin layer effectively gets wet and spreads, and a fingerprint wiping-off property is improved. When the average space distance falls within the above particularly preferable range, a fingerprint component significantly effectively gets wet and spreads, and a fingerprint wiping-off property is significantly improved.

An average space distance (Dm) of the convex or concave portions which are spaced from each other can be determined in the same manner.

First, a surface S of the lipophilic resin layer is observed by a scanning electron microscope (SEM). From the resultant surface SEM image, a space distance between convex or concave portions adjacent to each other is determined. The space distance refers to the shortest distance between outer edges of the convex or concave portions adjacent to each other when the surface S is viewed from above. This procedure is repeated at randomly selected 10 positions on the surface of the lipophilic resin layer to thereby determine the space distance D1, D2, . . . , D10.

Then, the space distances D1, D2, . . . , D10 are simply averaged (arithmetically averaged) to determine the average space distance (Dm) of the convex or concave portions.

Figure 1C:
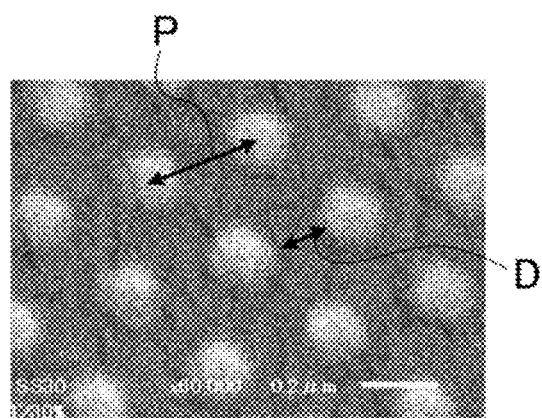
FIG. 1C is a scanning electron microscope (SEM) image of the lipophilic resin layer in FIG. 1A.

For example, FIG. 1C illustrates a SEM image of the lipophilic resin layer of which AFM images of a surface and a cross-section are illustrated in FIG. 1A and FIG. 1B. In FIG. 1C, the pitch (P) of the convex portions is 310 nm and the space distance (D) of the convex portions is 170 nm.

<<Filler Particles>>

The lipophilic resin layer contains filler particles.

The filler particles are not particularly limited. For example, organic particles, inorganic particles, or organic-inorganic hybrid particles may be used.

Examples of the organic particles include acrylic polymer particles, urethane polymer particles, styrene polymer particles, olefin polymer particles, ester polymer particles, and amide polymer particles.

Examples of the inorganic particles include silica particles, zirconia particles, titania particles, and niobium oxide particles.

Examples of the organic-inorganic hybrid particles include silicone particles, silicone rubber particles, silanol group-containing polymer particles, silsesquioxane particles, organic core/silicone shell particles, organic core/silicone rubber shell particles, and other organic core/inorganic shell particles, and inorganic core/organic shell particles.

A shape of the filler particles is not particularly limited, but preferably is, for example, spherical. As used herein, the term spherical includes approximately spherical. For example, the shape of the filler particles is not limited to spherical, and may be ellipsoidal, bowl-shaped, or snowman-shaped.

A number average particle diameter of the filler particles is not particularly limited, and may be appropriately selected taking into account the average thickness of the lipophilic resin layer and the kind of the filler particles as described above. However, the number average particle diameter is preferably less than 200 μm. When the number average particle diameter is 200 μm or more, a desired lipophilic resin layer of the present invention cannot be formed. Alternatively, the degree of exposure of the filler particles is difficult to control to a desired range. Thus, the effects of the present invention cannot be achieved.

The number average particle diameter of the filler particles is more preferably 0.5 μm to 100 μm, particularly preferably 1 μm to 20 μm.

[Measurement of Average Particle Diameter]

The average particle diameter of the filler particles is able to be measured using, for example, SALD-7500NANO (available from SHIMADZU CORPORATION).

In the present invention, when a lipophilic laminate is produced by the below-described method, the filler particles may be pushed and slightly crushed by a transfer matrix at a step of bringing into close contact with a transfer matrix and applying pressure. However, the filler particles return to a nearly original shape by removing the pressure. Therefore, particle diameters of the filler particles may be considered to be the nearly same without significantly changing before and after the transfer matrix is brought into close contact.

Note that, in the present invention, a particle diameter (b) of the filler particles in the lipophilic resin layer after the lipophilic laminate is produced can be measured in the following manner.

[Measurement of Particle Diameter (b) of Filler Particles]

A cross-sectional SEM image is taken through a peak height of an exposed portion of a filler particle. Based on the SEM image, the particle diameter (b) can be determined.

In the present invention, the filler particles may be slightly crushed into ellipsoidal- or snowman-shaped particles upon bringing into close contact with a transfer matrix and applying pressure. As a result, the ellipsoidal- or snowman-shaped particles may be incorporated into the lipophilic resin layer. In this case, the particle diameter of the filler particles is determined as a length in an average thickness direction of the lipophilic resin layer. That is, the symbol b in FIGS. 13A and 14A corresponds to the particle diameter.

An amount of the filler particles contained in the lipophilic resin layer is preferably 1% by mass to 30% by mass, more preferably 1% by mass to 10% by mass. When the amount is too small, the exposed portions of the filler particles are decreased, making it impossible to sufficiently exert the effects of the present invention. When the amount is too large, the lipophilic resin layer should have a larger average thickness for film formation. As a result, the exposed portions of the filler particles are decreased, making it impossible to sufficiently exert the effects of the present invention.

A grass transition temperature (Tg) of the filler particles is not particularly limited and may be appropriately selected depending on the intended purpose, but is preferably 25° C. or more. The Tg can be determined by, for example, a differential scanning calorimeter or a thermomechanical analyzer.

<<Exposure of Filler Particles>>

Figure 12A:
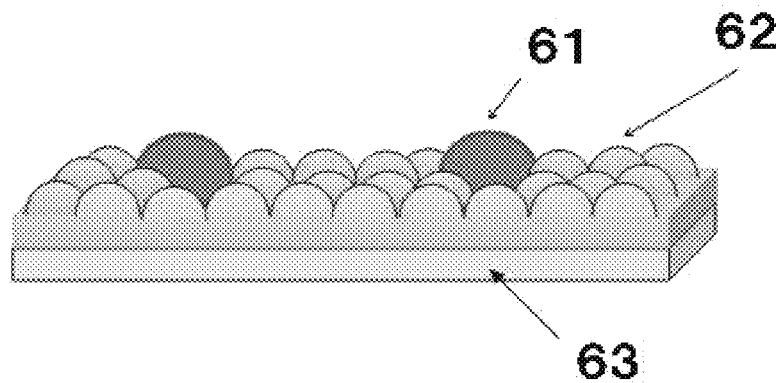
FIG. 12A is a schematic view illustrating a surface state of a lipophilic resin layer including micro convex portions and exposed filler particles.

Parts of the filler particles are exposed from the lipophilic resin layer. An aspect in which the filler particles are exposed from the lipophilic resin layer on which surface micro convex portions or micro concave portions are formed is described with reference to schematic views of FIGS. 12A and 12B. In FIG. 12A, a lipophilic resin layer (62) on which surface micro convex portions are formed is formed on a substrate (63), and parts of filler particles (61) are exposed from the lipophilic resin layer (62).

A rate of exposed portions of the filler particles relative to the surface of the lipophilic resin layer is 0.1% or more.

A lipophilic laminate of the present invention satisfying the above requirement has excellent fingerprint resistance even for long-term use and achieving a pleasant feel to the touch.

It is believed that the micro convex portions or the micro concave portions and the exposure portions of the filler particles are formed in a well-balanced manner, so that they interact with each other to achieve the pleasant feel to the touch and the excellent fingerprint resistance. When the rate of the exposed portions of the filler particles is too large or too small, the feel to the touch is deteriorated. It is also believed that the exposed portions allow fingerprint dirt to be inconspicuous and absorb the fingerprint dirt to prevent the dirt from adhering.

In order to allow the rate of the exposed portions of the filler particles to fall within the desired range, a kind of the filler particles, an exposed height a (μm) of the filler particles needs to be adjusted to a suitable range taking into account an average particle diameter of the filler particles, an amount of the filler particles, and an average thickness L (μm) of the lipophilic resin layer. Moreover, it is necessary that an average height of convex portions or an average depth of concave portions of the lipophilic resin layer is also taken into account to balance the above-described requirements.

In the present invention, the exposed height a (μm) of the filler particles exposed from a surface of the lipophilic resin layer is more preferably 0.1 μm to 29 μm.

The exposed height a is preferably appropriately adjusted taking into account a kind, an average particle diameter, and an amount of the filler particles and an average thickness L of the lipophilic resin layer.

When the exposed height a of the filler particles is higher than the above range, a feel to the touch is deteriorated and the lipophilic resin layer may be inappropriately formed.

In the present invention, a ratio a/L is more preferably 0.01 to 0.67 where a (μm) denotes an exposed height of the filler particles exposed from the surface of the lipophilic resin layer and L (μm) denotes an average thickness of the lipophilic resin layer.

Additionally, a ratio a/X is more preferably 2 to 200 where a (μm) denotes a (μm) denotes an exposed height of the filler particles exposed from the surface of the lipophilic resin layer and X (μm) denotes an average height of the micro convex portions or an average depth of the micro concave portions in the lipophilic resin layer.

Figure 12B:
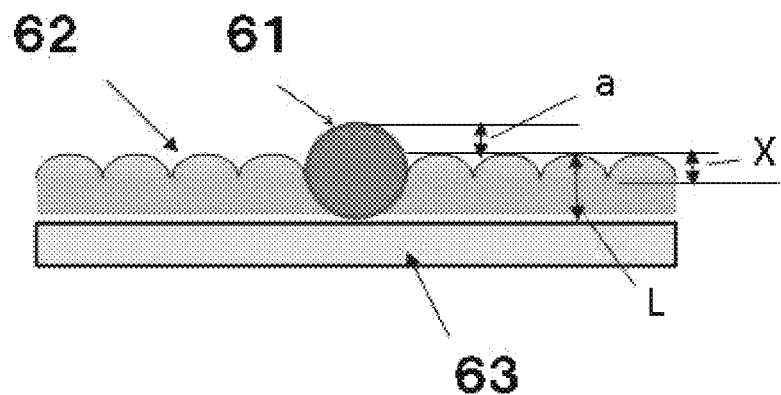
FIG. 12B is a schematic view illustrating a cross section of a lipophilic resin layer including micro convex portions and exposed filler particles.

FIG. 12 B is a cross-sectional view of the lipophilic resin layer which has micro convex portions and on which filler particles are exposed illustrated in FIG. 12A. In FIG. 12B, the exposed height a (μm) of the filler particles exposed from the surface of the lipophilic resin layer, the average thickness L (μm) of the lipophilic resin layer, and the average height or the average depth X (μm) of the micro convex portions or the micro concave portions are illustrated.

The lipophilic laminate of the present invention having the rate of the exposed portions of the filler particles falling within the desired range taking into account of the values of a, a/L, and a/X includes an appropriately formed lipophilic resin layer and filler particles stably embedded in the lipophilic resin layer, and is satisfactory in fingerprint resistance for a long period of time and a pleasant feel to the touch.

A cross-sectional view of one exemplary lipophilic resin layer of the present invention in which filler particles are exposed from micro convex portions is illustrated.

Figure 13A:
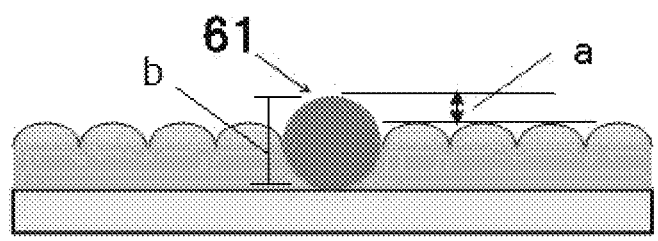
FIG. 13A is a schematic view illustrating a cross section of a lipophilic resin layer including micro convex portions and exposed filler particles.
Figure 13B:
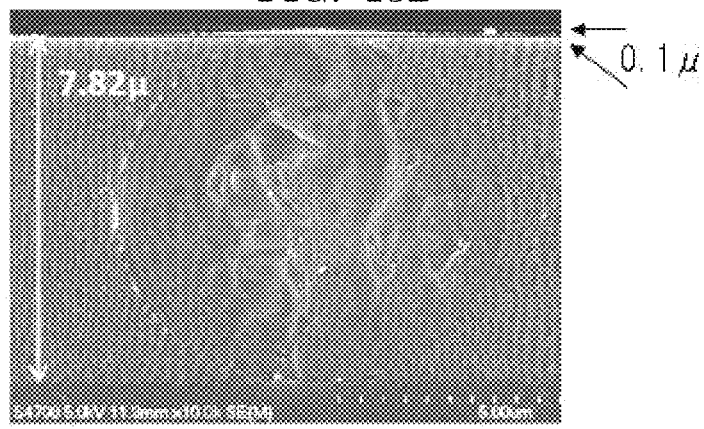
FIG. 13B is a SEM image illustrating a cross section of a lipophilic resin layer including micro convex portions and exposed filler particles.

FIG. 13B is a cross-sectional SEM image of a lipophilic resin layer of the present invention. FIG. 13A is a schematic view illustrating a positional relation between the lipophilic resin layer and the filler particles in FIG. 13B. In FIG. 13, inorganic particles were used as the filler particles.

Figure 14A:
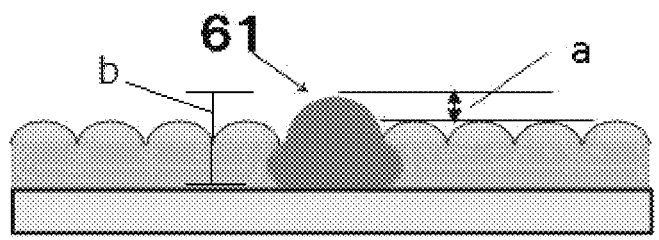
FIG. 14A is a schematic view illustrating a cross section of a lipophilic resin layer including micro convex portions and exposed filler particles.
Figure 14B:
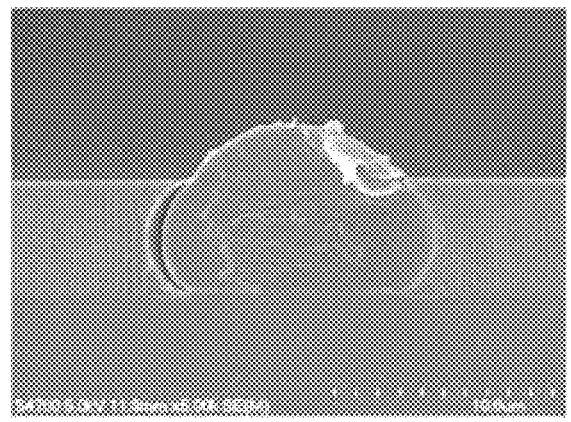
FIG. 14B is a SEM image illustrating a cross section of a lipophilic resin layer including micro convex portions and exposed filler particles.
Figure 14C:
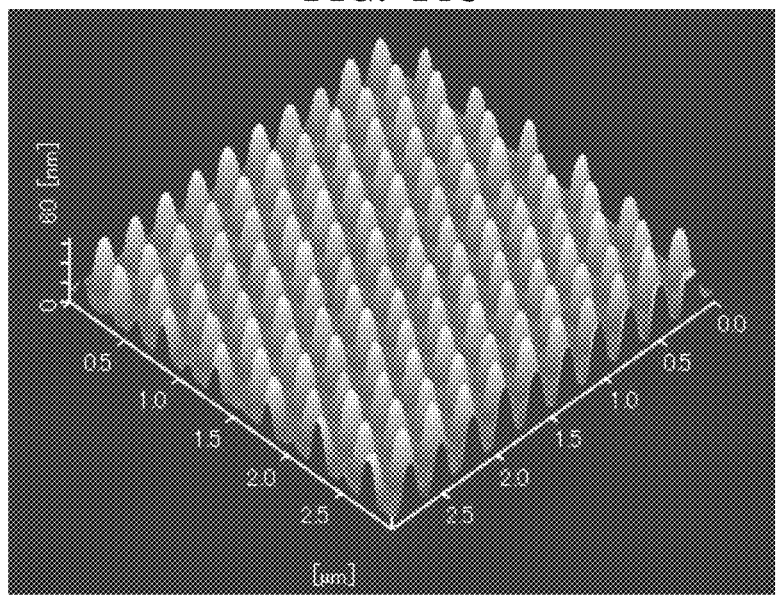
FIG. 14C is an AFM image illustrating enlarged micro convex portion in FIG. 14B.

FIG. 14B is a cross-sectional SEM image of another exemplary lipophilic resin layer of the present invention. FIG. 14C is an enlarged image (AFM image) of micro convex portions which are free of the filler particles in FIG. 14B. FIG. 14A is a schematic view illustrating a positional relation between the lipophilic resin layer and the filler particles in FIG. 14B. In FIG. 14, organic particles were used as the filler particles. When convex portions were formed on a surface of a lipophilic resin by the below-described producing method, the organic particles were slightly crushed in a plane direction into snowman-shaped particles during the production process.

The rate of the exposed portions of the filler particles relative to the surface of the lipophilic resin layer and the exposed height a (μm) of the filler particles are measured in the following manner.

[Measurement of Rate of Exposed Portions of Filler Particles]

A lipophilic laminate of the present invention is cut into a 100 mm×100 mm sample. This sample is attached onto a black acrylic plate (ACRYLITE-502 BLACK, available from MITSUBISHI RAYON CO., LTD.) and observed by an optical microscope (VHX-900, available from KEYENCE CORPORATION) at a magnification of 700. An image (400 μm×300 μm) is taken focusing on a surface of the sample. This procedure is repeated at any 10 positions. Next, the resultant images are subjected to binarization processing so as to turn protruded portions of particles into black. An analytical software IMAGEJ 1.47 is used to calculate a rate of black portions relative to the entire image. An average of rates of the 10 positions is determined as the rate of exposed portions of the filler particles (surface occupation area of the filler particles).

[Measurement of Exposed Height a (μm) of Filler Particles]

Filler particles are observed by a scanning electron microscope (SEM) and a cross-sectional SEM image is taken adjacent to a peak height of the exposed portions of the filler particles. Based on the SEM image, a height a1 is measured. As illustrated in FIG. 12B, a peak of the convex portion or the highest point of a mountain portion between the concave portions in the lipophilic resin layer is taken as zero (base line) for measuring the height a1. Heights of the peaks of the convex portions or the highest points of mountain portions between the concave portions are measured at 10 positions and averaged. A distance from the resultant average height to a peak of the filler particle is measured to thereby obtain the exposed height a1 of the filler particle. Based on cross-sectional SEM images of 10 particles, the values of a1 measured on the SEM images are averaged to determine the value of a (μm).

<<Active Energy Ray Curable Resin Composition>>

The active-energy-ray curable resin-composition is not particularly limited and may be appropriately selected depending on the intended purpose. Examples of the active-energy-ray curable resin-composition include those containing at least polyfunctional (meth)acrylic monomers, photoinitiators, and the filler particles; and, if necessary, further containing other components.

—Polyfunctional (meth)acrylic Monomer—

Examples of the polyfunctional (meth)acrylic monomers include 1,3-butylene glycol diacrylate, diethylene glycol diacrylate, neopentyl glycol diacrylate, tripropylene glycol diacrylate, ethoxylated (3) bisphenol A diacrylate, dipropylene glycol diacrylate, acrylate ester (dioxane glycol diacrylate), ethoxylated (4) bisphenol A diacrylate, isocyanuric acid EO-modified diacrylate, tricyclodecane dimethanol diacrylate, ethylene glycol dimethacrylate, 1,4-butanediol dimethacrylate, diethylene glycol dimethacrylate, 1,12-dodecanediol dimethacrylate, 1,3-butylene glycol dimethacrylate, ethoxylated (4) bisphenol A dimethacrylate, and ethoxylated (6) bisphenol A dimethacrylate. These may be used alone or in combination.

Additionally, as the polyfunctional (meth)acrylic monomers, difunctional urethane (meth)acrylates, difunctional epoxy(meth)acrylates, and difunctional polyester (meth)acrylates may be used.

The difunctional urethane (meth)acrylates may be commercially available products. Examples of the commercially available products include CN940, CN963, CN963A80, CN963B80, CN963E75, CN963E80, CN982A75, CN982B88, CN983, CN985B88, CN9001, CN9011, CN902J75, CN977C70, CN999, CN1963, and CN2920 (available from Sartomer Company, Inc.); EBECRYL 284 (available from DAICEL-ALLNEX LTD.); and AT-600 and UF-8001G (available from kyoeisha Chemical Co., Ltd.).

The difunctional epoxy(meth)acrylates may be commercially available products. Examples of the commercially available products include CN104, CN104A80, CN104B80, CN104D80, CN115, CN117, CN120, CN120A75, CN120B60, CN120B80, CN120060, CN120080, CN120D80, CN120E50, CN120M50, CN136, CN151, CN UVE151, CN UVE150/80, CN2100 (available from Sartomer Company, Inc.); EBECRYL 600, EBECRYL 605, EBECRYL 3700, EBECRYL 3701, EBECRYL 3702, and EBECRYL 3703 (available from DAICEL-ALLNEX LTD.); and 70PA, 200PA, 80MFA, 3002A, and 3000A (available from kyoeisha Chemical Co., Ltd.).

The difunctional polyester (meth)acrylate may be commercially available products. Examples of the commercially available products include CN2203 and CN2272 (available from Sartomer Company, Inc.).

A glass transition temperature (Tg) of the polyfunctional (meth)acrylic monomer is not particularly limited and may be appropriately selected depending on the intended purpose, but is preferably 50° C. or more. The Tg can be determined by means of a differential scanning calorimeter or a thermomechanical analyzer using, as a specimen, a cured product produced by incorporating 5 parts by mass of the polymerization initiator into 100 parts by mass of the polyfunctional (meth)acrylic monomer and irradiating with a ultraviolet ray at a dose of 1,000 mJ/cm$^2$ by a mercury lamp.

An amount of the polyfunctional (meth)acrylic monomer contained in the active-energy-ray curable resin-composition is not particularly limited and may be appropriately selected depending on the intended purpose, but is preferably 15.0% by mass to 99.9% by mass, more preferably 50.0% by mass to 99.0% by mass, particularly preferably 75.0% by mass to 98.0% by mass.

—Photoinitiator—

Examples of the photoinitiators include photoradical polymerization initiators, photo-acid generating agents, bisazido compounds, hexamethoxymethyl melamine, and tetramethoxy glycoluril.

The photoradical polymerization initiators are not particularly limited and may be appropriately selected depending on the intended purpose. Examples of the photoradical polymerization initiators include ethoxyphenyl(2,4,6-trimethylbenzoyl)phosphine oxide, bis(2,6-dimethylbenzoyl)-2,4,4-trimethylpentylphosphine oxide, bis(2,4,6-trimethylbenzoyl)-2,4,4-trimethylpentylphosphine oxide, bis(2,6-dichlorobenzoyl)-2,4,4-trimethylpentylphosphine oxide, 1-phenyl-2-hydroxy-2-methylpropan-l-on, 1-hydroxycyclohexylphenyl ketone, 1-(4-isopropylphenyl)-2-hydroxy-2-methylpropan-1-on, 1,2-diphenylethanedione, and methylphenylglyoxylate.

An amount of the photoinitiator contained in the active-energy-ray curable resin-composition is not particularly limited and may be appropriately selected depending on the intended purpose, but is preferably 0.1% by mass to 10% by mass, more preferably 0.5% by mass to 8% by mass, particularly preferably 1% by mass to 5% by mass.

The active-energy-ray curable resin-composition may be diluted with an organic solvent prior to use. Examples of the organic solvent include aromatic solvents, alcohol solvents, ester solvents, ketone solvents, glycol ether solvents, glycol ether ester solvents, chlorine solvents, ether solvents, N-methylpyrrolidone, dimethylformamide, dimethylsulfoxide, and dimethylacetamide.

The active-energy-ray curable resin-composition is cured by irradiating with an active energy ray. The active energy ray is not particularly limited and may be appropriately selected depending on the intended purpose. Examples of the active energy ray include electron beams, UV rays, infrared rays, laser beams, visible rays, ionizing radiation (e.g., X rays, α rays, β rays, and γ rays), microwaves, and high-frequency waves.

A Martens hardness of the lipophilic resin layer is not particularly limited and may be appropriately selected depending on the intended purpose, but is preferably 50 N/mm$^2$ to 300 N/mm$^2$, more preferably 100 N/mm$^2$ to 300 N/mm$^2$. In a molding process of the lipophilic laminate, for example, in injection molding of polycarbonate, the lipophilic laminate is heated and pressed at 290° C. and 200 MPa. At this time, the micro convex portions or the micro concave portions in the surface of the lipophilic resin layer may be deformed. For example, a height of the micro convex portions or a depth of the micro concave portions is decreased. The micro convex portions or the micro concave portions may be deformed as long as fingerprint resistance is not affected. However, when the micro convex portions or the micro concave portions are excessively deformed, an oleic acid contact angle is increased to deteriorate the fingerprint resistance. When the Martens hardness is less than 50 N/mm$^2$, the micro convex portions or the micro concave portions in the surface of the lipophilic resin layer are excessively deformed in the molding process of the lipophilic laminate, an oleic acid contact angle is increased to deteriorate the fingerprint resistance. Moreover, the lipophilic resin layer may be easily scratched in surface cleaning during ordinary use, for example, in handling and surface cleaning during a production or molding process of the lipophilic laminate. When the Martens hardness is more than 300 N/mm$^2$, the lipophilic resin layer may be cracked or peeled-off during the molding process. It is advantageous that the Martens hardness falls within the particularly preferable range because the lipophilic laminate can be easily molded into various three-dimensional shapes without deteriorating fingerprint resistance or without producing defects such as scratches, cracks, or peeling.

Note that, after the molding process of the lipophilic laminate, a high temperature and a high pressure are applied to the lipophilic resin layer at an injection molding step. Therefore, the Martens hardness of the lipophilic resin layer may be higher than that of before the molding process.

The Martens hardness can be measured, for example, by means of PICODENTOR HM500 (trade name; available from Fischer Instruments K.K.) using a diamond cone as a needle at a load of 1 mN/20 s and at a face angle of 136°.

A pencil hardness of the lipophilic resin layer is not particularly limited and may be appropriately selected depending on the intended purpose, but is preferably H to 4H. When the pencil hardness is less than H (softer than H), the lipophilic resin layer is easily scratched in surface cleaning during ordinary use, for example, in handling and surface cleaning during a production or molding process of the lipophilic laminate. Moreover, the micro convex portions or the micro concave portions in the surface of the lipophilic resin layer are excessively deformed in the molding process of the lipophilic laminate, an oleic acid contact angle may be increased to deteriorate the fingerprint resistance. When the pencil hardness is more than 4H (harder than 4H), the lipophilic resin layer may be cracked or peeled-off during the molding process. It is advantageous that the pencil hardness falls within the particularly preferable range because the lipophilic laminate can be easily molded into various three-dimensional shapes without deteriorating fingerprint resistance or without producing defects such as scratches, cracks, or peeling.

Note that, after the molding process of the lipophilic laminate, a high temperature and a high pressure are applied to the lipophilic resin layer at an injection molding step. Therefore, the pencil hardness of the lipophilic resin layer may be higher than that of before the molding process.

The pencil hardness is measured in accordance with JIS K 5600-5-4.

<Other Members>

Examples of the other members include an anchor layer, a protective layer, a sticky layer, an adhesive layer.

<<Anchor Layer>>

The anchor layer is provided between the substrate and the lipophilic resin layer. By providing the anchor layer in the lipophilic laminate, adhesiveness between the substrate and the lipophilic resin layer can be improved.

A refractive index of the anchor layer is preferably approximate to a refractive index of the lipophilic resin layer in order to prevent interference irregularity. For this reason, the refractive index of the anchor layer falls preferably within ±0.10, more preferably within ±0.05 of the refractive index of the lipophilic resin layer. Alternatively, the refractive index of the anchor layer is preferably between the refractive index of the lipophilic resin layer and a refractive index of the substrate.

The anchor layer can be formed by, for example, coating with an active-energy-ray curable resin-composition. Examples of the active-energy-ray curable resin-composition include those containing at least urethane (meth)acrylate and a photoinitiator; and, if necessary, further containing other components. The urethane (meth)acrylate and the photoinitiator may be the difunctional urethane (meth)acrylates and the photoinitiators as exemplified for the lipophilic resin layer. A method for coating is not particularly limited and may be appropriately selected depending on the intended purpose. Examples of the method include wire bar coating, blade coating, spin coating, reverse roll coating, die coating, spray coating, roll coating, gravure coating, microgravure coating, lip coating, air knife coating, curtain coating, a comma coat method, and a dipping method.

An average thickness of the anchor layer is not particularly limited and may be appropriately selected depending on the intended purpose, but is preferably 0.01 µm to 10 µm, more preferably 0.1 µm to 5 µm, particularly preferably 0.3 µm to 3 µm.

Note that, the anchor layer may be imparted with a reflectivity-reducing function or an antistatic function.

<<Protective L:ayer>>

The protective layer is not particularly limited and may be appropriately selected depending on the intended purpose, as long as it is formed on the lipophilic resin layer for the purpose of preventing the lipophilic resin layer from being damaged during a production or molding process of the lipophilic laminate. The protective layer is peeled-off when the lipophilic laminate is used.

<<Sticky Layer, Adhesive Layer>>

The sticky layer or the adhesive layer is not particularly limited and may be appropriately selected depending on the intended purpose, as long as it is formed on the substrate for the purpose of allowing the lipophilic laminate to adhere to a work piece or an adherend.

An elongation percentage of the lipophilic laminate is not particularly limited and may be appropriately selected depending on the intended purpose, but is preferably 10% or more, more preferably 10% to 200%, particularly preferably 40% to 150%. When the elongation percentage is less than 10%, it may be difficult to perform molding processing. It is advantageous that the elongation percentage falls within the particularly preferable range from the viewpoint of excellent molding processability.

The elongation percentage can be obtained, for example, in the following manner.

The lipophilic laminate is cut into strips of 10.5 cm in length×2.5 cm in width, which are used as measurement samples. A tensile elongation percentage of the measurement sample is measured by a tension-tester (AUTOGRAPH AG-5KNX PLUS, available from Shimadzu Corporation) under the following measurement conditions: tension speed=100 mm/min; and distance between chucks=8 cm. The measurement sample is subjected to the measurement while being visually observed to thereby determine the elongation percentage immediately before the lipophilic laminate is cracked. This procedure is repeated for measurement samples (N=5). The resultant elongation percentages are averaged, which is determined as the elongation percentage of the lipophilic laminate. Note that, a value of the elongation percentage only has to fall within the above range as measured at room temperature (25° C.) or a softening point of the substrate.

The lipophilic laminate preferably has a difference in in-plane heat shrinkage rate as small as possible between an X direction and a Y direction. For example, when the lipophilic laminate is in the form of roll, the X direction and the Y direction of the lipophilic laminate correspond to a longitudinal direction and a width direction of the roll. The difference in heat shrinkage rate between the X direction and the Y direction of the lipophilic laminate at a heating temperature employed at a heating step in the molding process preferably falls within 5%. When the difference is outside the range, the lipophilic resin layer may be peeled-off or cracked during the molding process. Alternatively, the letters, the patterns, or the images printed on the surface of the substrate may be deformed or displaced, potentially making it difficult to perform the molding process.

The lipophilic laminate is particularly suitable for films for in-mold forming, films for insert molding, and films for overlay molding.

A method for producing the lipophilic laminate is not particularly limited and may be appropriately selected depending on the intended purpose. For example, the lipophilic laminate of the present invention may be produced according to the below-described method.

(Method for Producing Lipophilic Laminate)

A method for producing a lipophilic laminate of the present invention includes at least an uncured resin layer forming step and a lipophilic resin layer forming step; and, if necessary, further includes other steps.

The method for producing a lipophilic laminate is a method for producing the lipophilic laminate of the present invention.

<Uncured Resin Layer Forming Step>

The uncured resin layer forming step is not particularly limited and may be appropriately selected depending on the intended purpose, as long as it is a step of coating a substrate with an active-energy-ray curable resin-composition containing filler particles to form an uncured resin layer.

The substrate is not particularly limited and may be appropriately selected depending on the intended purpose. For example, the substrate may be any of the substrates as exemplified for the lipophilic resin layer of the present invention.

The active-energy-ray curable resin-composition is not particularly limited and may be appropriately selected depending on the intended purpose. For example, the active-energy-ray curable resin-composition may be any of the active-energy-ray curable resin-compositions as exemplified for the lipophilic resin layer in the lipophilic laminate of the present invention.

The uncured resin layer is formed by coating the substrate with the active-energy-ray curable resin-composition and drying the composition as necessary. The uncured resin layer may be a flowable film due to low molecular weight curable components contained in the active-energy-ray curable resin-composition or a solid film.

A method for coating is not particularly limited and may be appropriately selected depending on the intended purpose. Examples of the method include wire bar coating, blade coating, spin coating, reverse roll coating, die coating, spray coating, roll coating, gravure coating, microgravure coating, lip coating, air knife coating, curtain coating, a comma coat method, and a dipping method.

The uncured resin layer remains uncured because the layer has not been irradiated with an active energy ray.

In the uncured resin layer forming step, the anchor layer formed on the substrate may be coated with the active-energy-ray curable resin-composition to form the uncured resin layer.

The anchor layer is not particularly limited and may be appropriately selected depending on the intended purpose. For example, the anchor layer may be any of the anchor layers as exemplified for the lipophilic laminate of the present invention.

<Lipophilic Resin Layer Forming Step>

The lipophilic resin layer forming step is not particularly limited and may be appropriately selected depending on the intended purpose, as long as it is a step of forming a lipophilic resin layer by applying pressure to the uncured resin layer with being in close contact with a transfer matrix having micro convex portions or micro concave portions to form a geometry of the micro convex portions or the micro concave portions in the uncured resin layer, removing the pressure, and curing the uncured resin layer by irradiating the uncured resin layer with an active energy ray with keeping the geometry of the micro convex portions or the micro concave portions to thereby transfer the micro convex portions or the micro concave portions.

—Transfer Matrix—

The transfer matrix has micro convex portions or micro concave portions.

A material, a size and a structure of the transfer matrix are not particularly limited and may be appropriately selected depending on the intended purpose.

A method for forming the micro convex portions or the micro concave portions in the transfer matrix is not particularly limited and may be appropriately selected depending on the intended purpose. However, the micro convex portions or the micro concave portions are preferably formed by etching a surface of the transfer matrix with a photoresist having a predetermined geometry pattern and serving as a protective film. Alternatively, the micro convex portions or the micro concave portions are preferably formed by irradiating a surface of the transfer matrix with laser to laser-process the transfer matrix.

—Active Energy Ray—

The active energy ray is not particularly limited and may be appropriately selected depending on the intended purpose, as long as the uncured resin layer can be cured by the active energy ray. For example, the active energy ray may be any of the active energy rays as exemplified for the lipophilic laminate of the present invention.

Specific examples of the lipophilic resin layer forming step will now be described with reference to drawings.

<<First Embodiment>>

The first embodiment is an example of the lipophilic resin layer forming step performed using a transfer matrix having micro convex portions or micro concave portions which are formed by etching a surface of the transfer matrix with a photoresist having a predetermined geometry pattern and serving as a protective film.

First, a transfer matrix and a method for producing the transfer matrix will be described.

[Structure of Transfer Matrix]

Figure 3A:
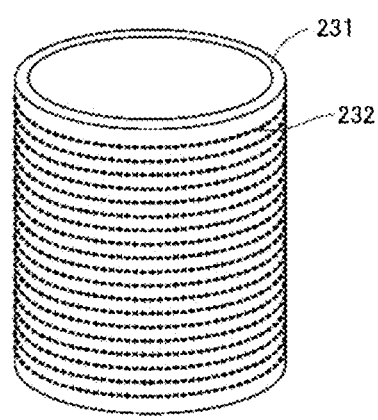
FIG. 3A is a perspective view illustrating one exemplary configuration of a roll matrix serving as a transfer matrix.
Figure 3B:
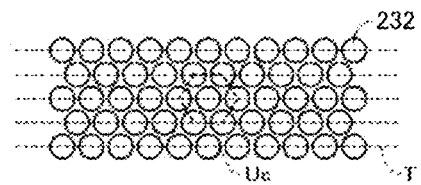
FIG. 3B is an enlarged partial plan view illustrating the roll matrix illustrated in FIG. 3A.
Figure 3C:
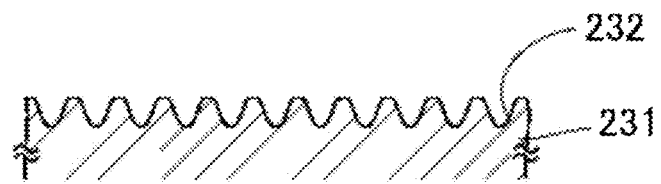
FIG. 3C is a cross-sectional view taken through the track T in FIG. 3B.

FIG. 3A is a perspective view illustrating one exemplary structure of a roll matrix serving as the transfer matrix. FIG. 3B is an enlarged partial plan view illustrating the roll matrix illustrated in FIG. 3A. FIG. 3C is a cross-sectional view taken through the track T in FIG. 3B. A roll matrix 231 is a transfer matrix for producing a lipophilic laminate having the above-described configuration, more specifically, is a matrix for molding a plurality of convex or concave portions in a surface of the lipophilic resin layer. The roll matrix 231 is, for example, in the form of column or cylinder. A surface of the column or cylinder serves as a molding surface for forming a plurality of convex or concave portions on the surface of a lipophilic resin layer. For example, a plurality of structures 232 are two-dimensionally arranged in the molding surface. In FIG. 3C, the structures 232 are concave relative to the molding surface. For example, a material of the roll matrix 231 may be, but not particularly limited to, glass.

The plurality of structures 232 arranged in the molding surface of the roll matrix 231 and a plurality of convex or concave portions arranged in the surface of the lipophilic resin layer have mutually inverted convexo-concave patterns. That is, array, a size, a shape, an arrangement pitch, a height or depth, and an aspect ratio of the structures 232 of the roll matrix 231 are equivalent to those of the convex or concave portions of the lipophilic resin layer.

[Roll-matrix Exposure Device]

Figure 4:
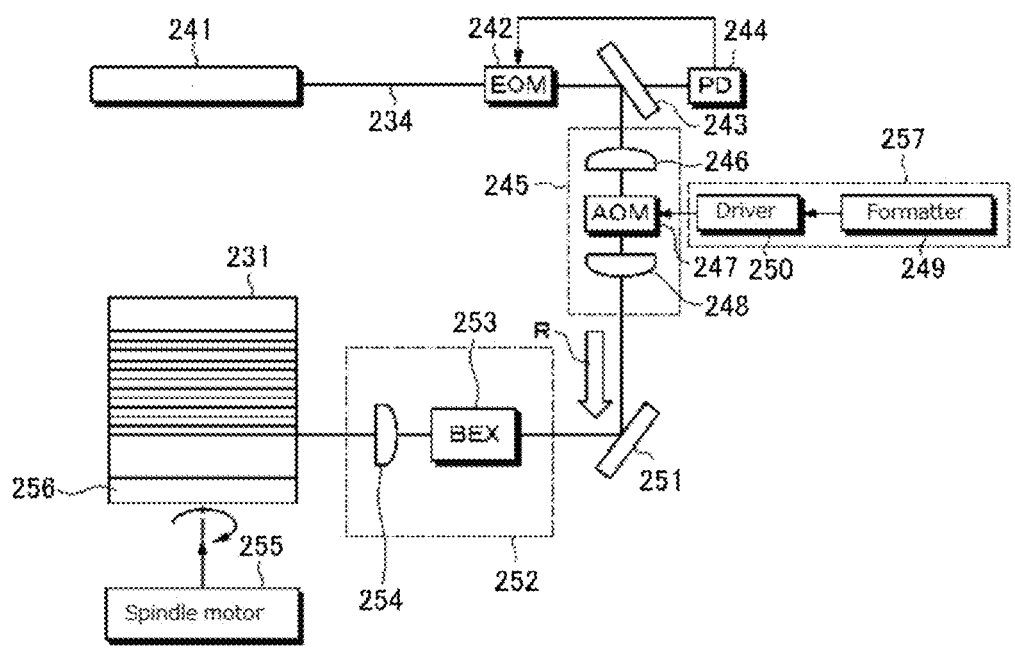
FIG. 4 is a schematic view illustrating one exemplary configuration of a roll-matrix exposure device used for producing a roll matrix.

FIG. 4 is a schematic view illustrating one exemplary configuration of a roll-matrix exposure device used for producing a roll matrix. The roll-matrix exposure device is constituted based on an optical disk recording device.

A laser beam source 241 is a light source configured to expose a resist, which has been deposited to a surface of the roll matrix 231 serving as a recording medium, to light. For example, the laser beam source emits laser beams for recording 234 having a wavelength X of 266 nm. The laser beams 234 emitted from the laser beam source 241 rectilinearly propagate in the form of collimated beams, and enter an electro optical modulator (EOM) 242. The laser beams 234 passed through the electro optical modulator 242 are reflected by a mirror 243 and directed to an optical modulation system 245.

The mirror 243, which is made of a polarization beam splitter, is configured to reflect one polarized component and transmit the other polarized component. The polarized component passed through the mirror 243 is received by a photodiode 244. The electro optical modulator 242 is controlled based on the received signal to perform phase modulation of the laser beams 234.

In the optical modulation system 245, the laser beams 234 are condensed via a condensing lens 246 on an acousto-optic modulator (AOM) 247 formed of, for example, glass ($SiO_2$). The laser beams 234 are modified in intensity by the acousto-optic modulator 247 and diverged, and then, collimated by a lens 248. The laser beams 234 emitted from the optical modulation system 245 are reflected by a mirror 251 and directed to a movable optical table 252 in a horizontal and parallel manner.

The movable optical table 252 includes a beam expander 253 and an objective lens 254. The laser beams 234 directed to the movable optical table 252 are shaped into a desired beam shape by the beam expander 253, and then emitted via the objective lens 254 to a resist layer on the roll matrix 231. The roll matrix 231 is placed on a turn table 256 connected to a spindle motor 255. While rotating the roll matrix 231 and simultaneously moving the laser beams 234 in a height direction of the roll matrix 231, the resist layer formed on a peripheral side surface of the roll matrix 231 is intermittently irradiated with the laser beams 234. Thus, a step of exposing the resist layer to light is performed. The thus-formed latent image has an approximately ellipsoid shape having a major axis in a circumferential direction. The laser beams 234 are moved by moving the movable optical table 252 in a direction indicated by the arrow R.

The exposure device includes a control mechanism 257 configured to form a latent image corresponding to a two-dimensional pattern of the plurality of convex or concave portions, on the resist layer. The control mechanism 257 includes a formatter 249 and a driver 250. The formatter 249 includes a polarity inversion section. The polarity inversion section is configured to control a timing at which the resist layer is irradiated with the laser beams 234. The driver 250 is configured to control the acousto-optic modulator 247 in response to output from the polarity inversion section.

In the roll-matrix exposure device, intensity modulation is performed by the acousto-optic modulator 247 by generating a signal while synchronizing a polarity inversion formatter signal with a rotation controller track by track so that a two-dimensional pattern is spatially linked. A two-dimensional pattern such as a hexagonal lattice pattern can be recorded through patterning at a constant angular velocity (CAV), an appropriate rotation number, an appropriate modulation frequency, and an appropriate feed pitch.

[Resist Film Formation Step]

Figure 5A:
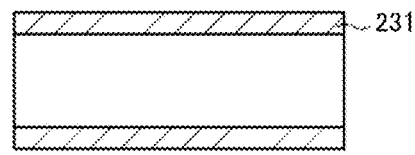
FIG. 5A is a process drawing illustrating one exemplary process for producing a roll matrix.
Figure 5B:
FIG. 5B is a process drawing illustrating one exemplary process for producing a roll matrix.

First, as illustrated in the cross-sectional view of FIG. 5A, a columnar or cylindrical roll matrix 231 is prepared. The roll matrix 231 is, for example, a glass matrix. Next, as illustrated in the cross-sectional view of FIG. 5B, a resist layer (for example, photoresist) 233 is formed on the surface of the roll matrix 231. Examples of a material for the resist layer 233 include organic resists and inorganic resists. Examples of the organic resists include Novolak resists and chemical amplification resists. Examples of the inorganic resist include metal compounds.

[Exposure Step]

Figure 5C:
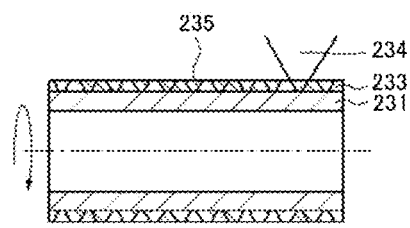
FIG. 5C is a process drawing illustrating one exemplary process for producing a roll matrix.

Next, as illustrated in the cross-sectional view of FIG. 5C, the resist layer 233 formed on the surface of the roll matrix 231 is irradiated with the laser beams (exposure beams) 234. Specifically, the roll matrix 231 is placed on the turn table 256 of the roll-matrix exposure device illustrated in FIG. 4. The resist layer 233 is irradiated with the laser beams (exposure beams) 234 while rotating the roll matrix 231. At this time, the resist layer is intermittently irradiated with the laser beams 234 while moving the laser beams 234 in a height direction (direction in parallel to a center axis of the columnar or cylindrical roll matrix 231) of the roll matrix 231 to thereby expose the entire surface of the resist layer 233 to light. Thus, a latent image 235 is formed on the entire surface of the resist layer 233 in accordance with a track of the laser beams 234.

The latent image 235 is, for example, arranged so as to form a plurality of tracks T in the surface of the roll matrix and is formed in a pattern where predetermined unit cells Uc appear regularly and periodically. The latent image 235 has, for example, a circular or elliptical shape. When the latent image 235 has an elliptical shape, the elliptical shape preferably has a major axis in an extending direction of the tracks T.

[Developing Step]

Figure 5D:
FIG. 5D is a process drawing illustrating one exemplary process for producing a roll matrix.

Next, for example, a developer liquid is dripped onto the resist layer 233 to develop the resist layer 233 while rotating the roll matrix 231. Thus, as illustrated in the cross-sectional view of FIG. 5D, a plurality of openings are formed in the resist layer 233. When the resist layer 233 is formed as a positive-type resist, an exposed area which has been irradiated with the laser beams 234 is dissolved in the developer liquid faster than a non-exposed area. As a result, as illustrated in the cross-sectional view of FIG. 5D, a pattern in accordance with the latent image (exposed area) 235 is formed on the resist layer 233. The pattern of the openings is, for example, a pattern where predetermined unit cells Uc appear regularly and periodically.

[Etching Step]

Figure 5E:
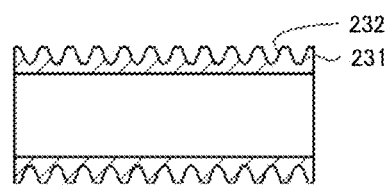
FIG. 5E is a process drawing illustrating one exemplary process for producing a roll matrix.

Next, the surface of the roll matrix 231 is etched using, as a mask, the pattern (resist pattern) of the resist layer 233 formed on the roll matrix 231. Thus, cone-shaped structures (concave portions) 232 can be formed, as illustrated in the cross-sectional view of FIG. 5E. The cone shape is preferably an elliptical cone shape or a truncated elliptical cone shape having a major axis in the extending direction of the tracks T. Dry etching or wet etching may be used. For example, an etching process and an ashing process may be alternately performed to form a pattern of the cone-shaped structures 232. Thus, the intended roll matrix 231 can be obtained.

[Transfer Process]

Figure 6A:
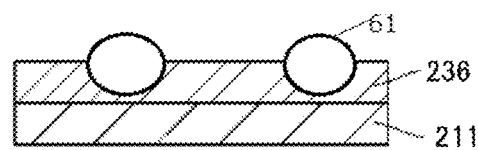
FIG. 6A is a process drawing illustrating one exemplary process for transferring micro convex portions or micro concave portions by a roll matrix.

As illustrated in the cross-sectional view of FIG. 6A, a substrate made of a resin 211, on which an uncured resin layer 236 containing exposed filler particles 61 is formed, is prepared.

Figure 6B:
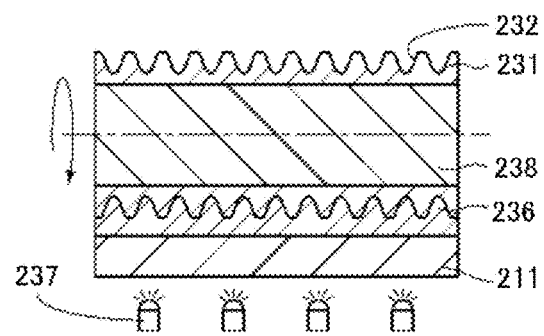
FIG. 6B is a process drawing illustrating one exemplary process for transferring micro convex portions or micro concave portions by a roll matrix.
Figure 6C:
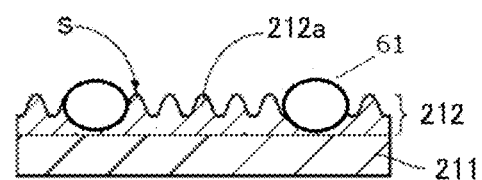
FIG. 6C is a process drawing illustrating one exemplary process for transferring micro convex portions or micro concave portions by a roll matrix.

Next, as illustrated in the cross-sectional view of FIG. 6B, a lipophilic resin layer 212, on which micro convex or concave portions 212a are formed and filler particles 61 are exposed, is obtained by applying pressure to the uncured resin layer 236, which is formed on the substrate made of a resin 211, with being in close contact with the roll matrix 231 to form the micro convex or concave portions 212a in the uncured resin layer 236, removing the pressure, and curing the uncured resin layer 236 by irradiating the uncured resin layer with an active energy ray 237 with keeping geometry of the micro convex or concave portions 212a to thereby transfer the micro convex or concave portions 212a (FIG. 6C).

In the above-described manner, a surface layer including both of the micro convex or concave portions and exposed portions of the filler particles can be formed.

The filler particles in the uncured resin layer may be pushed and slightly crushed by a roll matrix upon bringing into close contact with the roll matrix and applying pressure. However, the filler particles return to a nearly original shape by removing the pressure. In this state, the uncured resin layer is irradiated with the active energy ray to cure. Therefore, the lipophilic laminate of the present invention can be produced without any problem. Note that, in the present invention, the filler particles may be slightly crushed into ellipsoidal- or snowman-shaped particles upon bringing into close contact with a matrix and applying pressure. When the uncured resin layer is cured in this state, the ellipsoidal- or snowman-shaped particles may be incorporated into a cured layer. However, this is acceptable.

Inorganic particles are crushed slightly, but to a lower extent than organic particles upon bringing into close contact with the roll matrix and applying pressure. Therefore, time for which the uncured resin layer is brought into close contact with the matrix and pressure to be applied are preferably appropriately set taking into account a kind, a particle diameter, and an amount of the filler particles, an exposed height a of the filler particles, and an average thickness L of the lipophilic resin layer.

The roll matrix may be brought into close contact with the uncured resin layer to an extent that the geometry of the micro convex portions or the micro concave portions is transferred on a surface area of the lipophilic resin layer other than the exposed portions of the filler particles.

Note that, the geometry of the micro convex portions or the micro concave portions may or may not be transferred on the exposed portions of the filler particles.

After removing the pressure, the uncured resin layer is irradiated with an active energy ray with keeping the geometry of the micro convex portions or the micro concave portions.

In the present invention, the uncured resin layer may be irradiated with the active energy ray for about 1 second.

When the substrate made of a resin 211 is formed of a material which does not transmit an active energy ray such as a ultraviolet ray, it is possible that the roll matrix 231 is formed of a material which can transmit an active energy ray (for example, quartz) and the uncured resin layer 236 is irradiated with the active energy ray from the inside of the roll matrix 231. Note that, the transfer matrix is not limited to the above-described roll matrix 231 and a flat-plate matrix may be used. However, from the viewpoint of improving mass productivity, the above-described roll matrix 231 is preferably used as the transfer matrix.

<<Second Embodiment>>

The second embodiment is an example of the lipophilic resin layer forming step performed using a transfer matrix having micro convex portions or micro concave portions which are formed by irradiating a surface of the transfer matrix with laser to laser-process the transfer matrix.

First, a transfer matrix and a method for producing the transfer matrix will be described.

[Structure of Transfer Matrix]

Figure 7A:
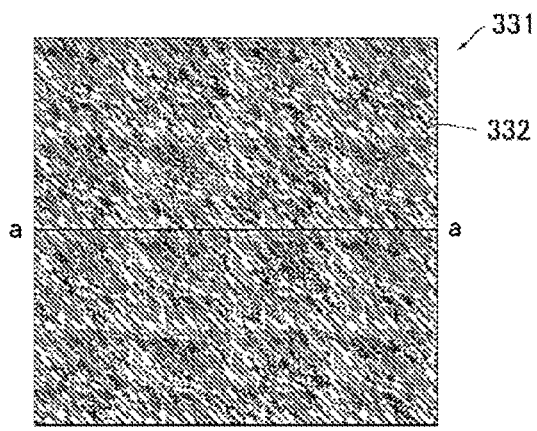
FIG. 7A is a plan view illustrating one exemplary configuration of a plate matrix serving as a transfer matrix.
Figure 7B:
FIG. 7B a cross-sectional view taken through the a-a line in FIG. 7A.
Figure 7C:
FIG. 7C is an enlarged partial cross-sectional view of FIG. 7B.

FIG. 7A is a plan view illustrating one exemplary configuration of a plate matrix. FIG. 7B a cross-sectional view taken through the a-a line in FIG. 7A. FIG. 7C is an enlarged partial cross-sectional view of FIG. 7B. A plate matrix 331 is a matrix used for producing a lipophilic laminate having the above-described configuration, more specifically, a matrix used for molding a plurality of convex or concave portions in a surface of the lipophilic resin layer. The plate matrix 331 has, for example, a surface on which a micro convex or concave pattern is formed, and the surface serves as a molding surface for forming a plurality of convex or concave portions in the surface of the lipophilic resin layer. For example, a plurality of structures 332 are formed on the molding surface. The structures 332 illustrated in FIG. 7C are concave relative to the molding surface. The plate matrix 331 may be, for example, formed of a metal material. Examples of the metal material include Ni, NiP, Cr, Cu, Al, Fe, and alloys thereof. The alloy is preferably stainless steel (SUS). Examples of the stainless steel (SUS) include, but not limited to, SUS304 and SUS420J2.

The plurality of structures 332 arranged in the molding surface of the plate matrix 331 and a plurality of convex or concave portions arranged in the surface of the lipophilic resin layer have mutually inverted convexo-concave patterns. That is, array, a size, a shape, an arrangement pitch, and a height or depth of the structures 332 of the plate matrix 331 are equivalent to those of the convex or concave portions of the lipophilic resin layer.

[Configuration of Laser Processing Device]

Figure 8:
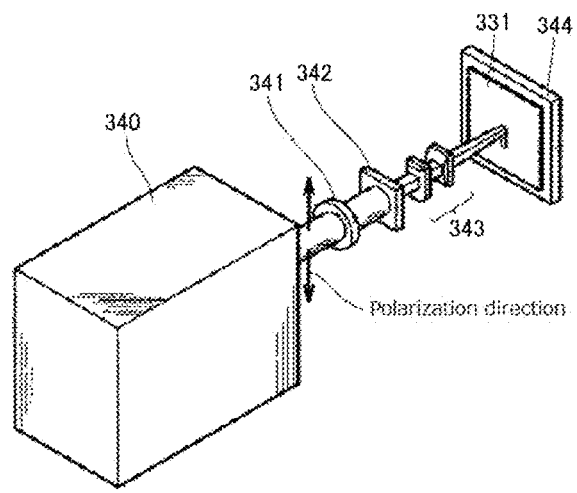
FIG. 8 is a schematic view illustrating one exemplary configuration of a laser processing device used for producing a plate matrix.

FIG. 8 is a schematic view illustrating one exemplary configuration of a laser processing device used for producing a plate matrix. A laser main-body 340 is, for example, IFRIT (trade name, available from Cyber Laser Inc.). A wavelength of laser to be used for laser processing is, for example, 800 nm. However, the wavelength may be, for example, 400 nm or 266 nm. A repetitive frequency is preferably large in view of processing time and decreasing a pitch between concave or convex portions to be formed, and is preferably 1,000 Hz or more. A pulse width of the laser is preferably short, and is preferably about 200 femto seconds ($10^{-15}$ seconds) to about 1 pico-second ($10^{-12}$ seconds).

The laser main-body 340 is configured to emit laser beams linearly polarized in a vertical direction. Therefore, in this device, laser beams are linearly polarized in a desired direction or circular polarized by rotating a polarization direction using a wave plate 341 (for example, λ/2 wave plate). In this device, some of laser beams are taken out using an aperture 342 having a square opening in order to obtain laser beams having a uniform in-plane intensity distribution by using only laser beams adjacent to the center of the laser beams of which intensity is distributed according to Gaussian distribution. Moreover, in this device, the laser beam is condensed by two cylindrical lenses 343 disposed orthogonal to each other to thereby give a desired beam size. When the plate matrix 331 is processed, a linear stage 344 is moved at a constant speed.

A beam spot of the laser to be emitted to the plate matrix 331 is preferably square-shaped. The beam spot can be shaped, for example, using an aperture or a cylindrical lens. The beam spot preferably has an intensity distribution as uniform as possible. This is because an in-plane distribution of, for example, heights of convex portions or depths of concave portions to be formed in a mold is preferably as uniform as possible. A size of the beam spot is typically smaller than an area to be processed. Therefore, it is necessary to scan the laser beams across the entire area to be processed to thereby form a convexo-concave pattern thereon.

The matrix (mold) used for molding the surface of the lipophilic resin layer is, for example, formed by irradiating a metallic substrate such as SUS, NiP, Cu, Al, and Fe with ultrashort pulsed-laser beams having a pulse width of 1 pico-second ($10^{-12}$ seconds) or less, so-called femto second laser beams, to thereby draw a pattern. The laser beams may be polarized linearly, circularly, or ellipsoidally. In this case, a desired convexo-concave pattern can be formed by appropriately setting, for example, a laser wavelength, a repetitive frequency, a pulse width, a beam-spot shape, polarization, an intensity of laser beams to be emitted to a sample, and a laser scanning speed.

Parameters that can be modified in order to obtain the desired pattern are, for example, as follows. Fluence refers to an energy density (J/cm²) per pulse and can be determined according to following expression:

$$F=P/(fREPT \times S)$$

where $$S=Lx \times Ly$$

F: Fluence
P: Power of laser
fREPT: Repetitive frequency of laser
S: Area of laser at irradiation position
Lx×Ly: Beam size.

Note that, a pulse number N refers to the number of pulses with which a single site is irradiated and determined according to the following expression:

$$N=fREPT \times Ly/v$$

where
Ly: Beam size of laser in scanning direction
v: Scanning speed of laser.

In order to obtain the desired pattern, a material of the plate matrix 331 may be changed. A pattern formed through laser processing varies depending upon the material of the plate matrix 331. In addition to the use of the metallic substrate such as SUS, NiP, Cu, Al, and Fe, a matrix surface may be coated with, for example, a semiconductor material such as DLC (diamond-like carbon). Examples of a method for coating the matrix surface with the semiconductor material include plasma CVD and sputtering. For example, fluorine (F)-doped DLC, titanium nitride, or chromium nitride may be used as the semiconductor material, in addition to the DLC. An average thickness of the resultant coated film may be, for example, about 1 μm.

[Laser Processing Step]

Figure 9A:
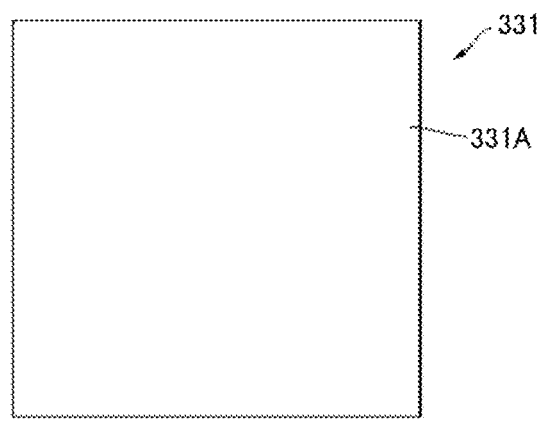
FIG. 9A is a process drawing illustrating one exemplary process for producing a plate matrix.

First, as illustrated in FIG. 9A, the plate matrix 331 is prepared. A surface 331A, which serves as a processed surface, of the plate matrix 331 is, for example, in a mirror surface state. Note that, the surface 331A may not be in the mirror surface state. The surface 331A may have a finer convexo-concave pattern than those to be transferred, a convexo-concave pattern equivalent to those to be transferred, or a coarser convexo-concave pattern than those to be transferred.

Figure 9B:
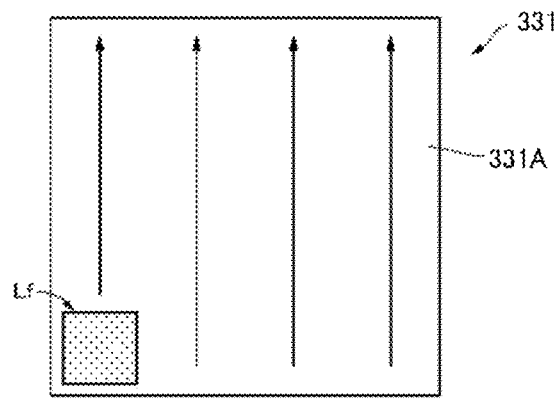
FIG. 9B is a process drawing illustrating one exemplary process for producing a plate matrix.

Next, the surface 331A of the plate matrix 331 is laser-processed using the laser processing device illustrated in FIG. 8 in the following manner. First, the surface 331A of the plate matrix 331 is irradiated with ultrashort pulsed-laser beams having a pulse width of 1 pico-second ($10^{-12}$ seconds) or less, so-called femto second laser beams to thereby draw a pattern. For example, as illustrated in FIG. 9B, the surface 331A of the plate matrix 331 is irradiated with femto second laser beams Lf and an irradiation spot thereof is scanned across the surface 331A.

Figure 9C:
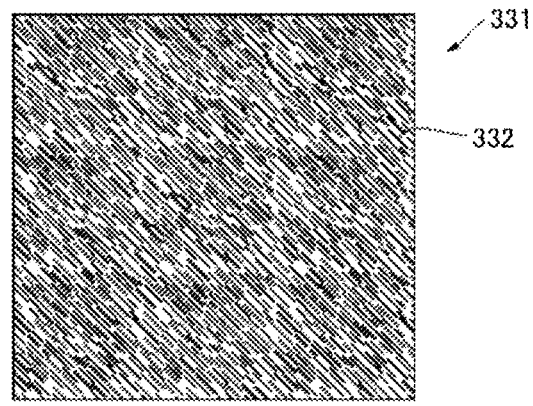
FIG. 9C is a process drawing illustrating one exemplary process for producing a plate matrix.

In this case, a plurality of structures 332 having the desired pattern as illustrated in FIG. 9C is formed by appropriately setting, for example, a laser wavelength, a repetitive frequency, a pulse width, a beam-spot shape, polarization, an intensity of laser beams to be emitted to the surface 331A, and a laser scanning speed.

[Transfer Process]

Figure 10A:
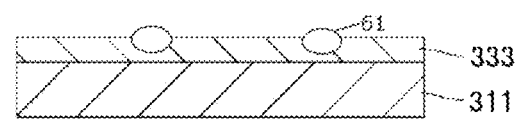
FIG. 10A is a process drawing illustrating one exemplary process for transferring micro convex portions or micro concave portions by a plate matrix.

As illustrated in the cross-sectional view of FIG. 10A, a substrate made of a resin 311, on which an uncured resin layer 333 containing exposed filler particles 61 is formed, is prepared.

Figure 10B:
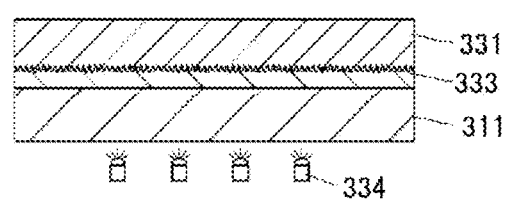
FIG. 10B is a process drawing illustrating one exemplary process for transferring micro convex portions or micro concave portions by a plate matrix.
Figure 10C:
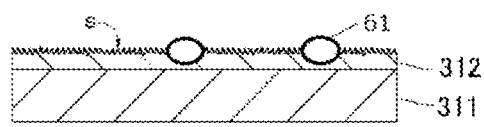
FIG. 10C is a process drawing illustrating one exemplary process for transferring micro convex portions or micro concave portions by a plate matrix.

Next, as illustrated in the cross-sectional view of FIG. 10B, a lipophilic resin layer 312, on which micro convex or concave portions are formed and filler particles 61 are exposed, is obtained by applying pressure to the uncured resin layer 333, which is formed on the substrate made of a resin 311, with being in close contact with the plate matrix 331 to form the micro convex or concave portions in the uncured resin layer 333, removing the pressure, and curing the uncured resin layer 333 by irradiating the uncured resin layer with an active energy ray 334 with keeping geometry of the micro convex or concave portions to thereby transfer the micro convex or concave portions (FIG. 10C).

Note that, when the substrate made of a resin 311 is formed of a material which does not transmit an active energy ray such as a ultraviolet ray, it is possible that the plate matrix 331 is formed of a material which can transmit an active energy ray (for example, quartz) and the uncured resin layer 333 is irradiated with the active energy ray from a backside of the plate matrix 331 (i.e., a surface opposite to the molding surface).

(Article)

An article of the present invention includes the hydrophilic laminate of the present invention on a surface thereof; and, if necessary, further includes other members.

The article is not particularly limited and may be appropriately selected depending on the intended purpose. Examples of the article include touch panels, smartphones, tablet PCs, cosmetic containers, accessories, glass windows, refrigerating/freezing show cases, window materials for automobile windows, bath mirrors, mirrors such as automobile side mirrors, pianos, and construction materials.

The article may be glasses, goggles, helmets, lenses, microlens arrays; and headlight covers, front panels, side panels, rear panels, door trims, instrument panels, center cluster/center console panels, shift knobs, members around a shift knob, and steering emblems of automobiles. These are preferably formed by in-mold molding, insert molding, or overlay molding.

The lipophilic laminate may be formed on a part or the whole of the surface of the article.

The lipophilic laminate of the present invention is satisfactory in fingerprint resistance for a long period of time and a pleasant feel to the touch. Therefore, the lipophilic laminate of the present invention effectively serves as an antifouling layer for the article.

A method for producing the article is not particularly limited and may be appropriately selected depending on the intended purpose, but is preferably the below-described method for producing the article of the present invention.

(Method for Producing Article)

A method for producing an article of the present invention includes at least a heating step, a lipophilic laminate molding step, and an injection molding step; and, if necessary, further includes other steps.

The method for producing an article is a method for producing the article of the present invention.

<Heating Step>

The heating step is not particularly limited and may be appropriately selected depending on the intended purpose, as long as it is a step of heating a lipophilic laminate.

The lipophilic laminate is the lipophilic laminate of the present invention.

The heating is not particularly limited and may be appropriately selected depending on the intended purpose, but is preferably infrared heating.

A temperature in the heating step is not particularly limited and may be appropriately selected depending on the intended purpose. When the substrate is a substrate made of a resin, the temperature is preferably adjacent to, equal to, or higher than a glass transition temperature of the substrate made of a resin.

Time in the heating step is not particularly limited and may be appropriately selected depending on the intended purpose.

<Lipophilic Laminate Molding Step>

The lipophilic laminate molding step is not particularly limited and may be appropriately selected depending on the intended purpose, as long as it is a step of molding the lipophilic laminate which has been heated as described above into a desired shape. For example, a step of bringing the lipophilic laminate into close contact with a predetermined mold and molding the lipophilic laminate into a desired shape by application of air pressure may be performed.

<Injection Molding Step>

The injection molding step is not particularly limited and may be appropriately selected depending on the intended purpose, as long as it is a step of injecting a molding material onto a substrate of the lipophilic laminate which has been molded into the desired shape and molding the molding material.

The molding material may be, for example, resins. Examples of the resins include olefin resins, styrene resins, ABS resins (acrylonitrile-butadiene-styrene copolymers), AS resins (acrylonitrile-styrene copolymers), acrylic resins, urethane resins, unsaturated polyester resins, epoxy resins, polyphenylene oxide/polystyrene resins, polycarbonates, polycarbonate-modified polyphenylene ethers, polyethylene terephthalates, polysulfones, polyphenylene sulfides, polyphenylene oxides, polyetherimides, polyimides, liquid crystal polyesters, polyallyl heat-resistant resins, various composite resins, and various modified resins.

A method for injecting is not particularly limited and may be appropriately selected depending on the intended purpose. For example, a method in which a molten molding material is injected onto a substrate of the lipophilic laminate which has been brought into close contact with a predetermined mold may be performed.

The method for producing an article is preferably performed using an in-mold molding device, an insert molding device, or an overlay forming device.

One exemplary method for producing an article of the present invention will now be described with reference to the accompanying drawings. This method is a producing method using an in-mold molding device.

First, a lipophilic laminate 500 is heated. The heating is preferably performed by infrared heating.

Figure 11A:
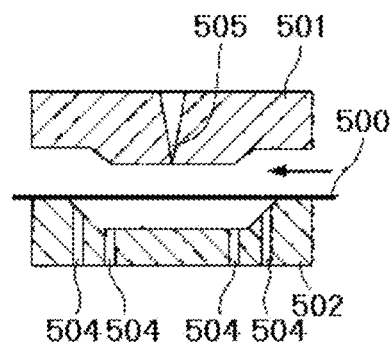
FIG. 11A is a process drawing illustrating one exemplary process for producing an article of the present invention by in-mold molding.

Then, as illustrated in FIG. 11A, the lipophilic laminate 500 which has been heated is placed at a predetermined position between a first mold 501 and a second mold 502 so that the substrate made of a resin of the lipophilic laminate 500 faces the first mold 501 and a lipophilic resin layer faces the second mold 502. In FIG. 11A, the first mold 501 is fixed, but the second mold 502 is movable.

Figure 11B:
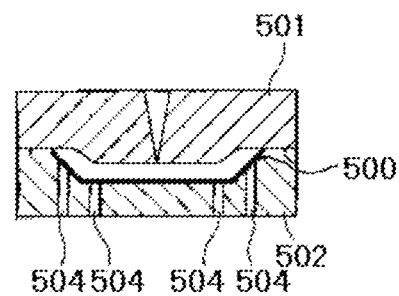
FIG. 11B is a process drawing illustrating one exemplary process for producing an article of the present invention by in-mold molding.

After the lipophilic laminate 500 is placed between the first mold 501 and the second mold 502, the first mold 501 and the second mold 502 are clamped. Subsequently, the lipophilic laminate 500 is suctioned through suction holes 504 opened on a cavity surface of the second mold 502 to fit the lipophilic laminate 500 onto the cavity surface of the second mold 502. Thus, the lipophilic laminate 500 is shaped the cavity surface. At this time, a periphery of the lipophilic laminate 500 may be fixed and positioned by a film fixation mechanism (not illustrated). Then, an unnecessary portion of the lipophilic laminate 500 is trimmed away (FIG. 11B).

Note that, when the second mold 502 has no suction hole 504 and the first mold 501 has a compressed air hole (not illustrated), compressed air is fed through the compressed air hole of the first mold 501 to the lipophilic laminate 500 to thereby fit the lipophilic laminate 500 onto the cavity surface of the second mold 502.

Figure 11C:
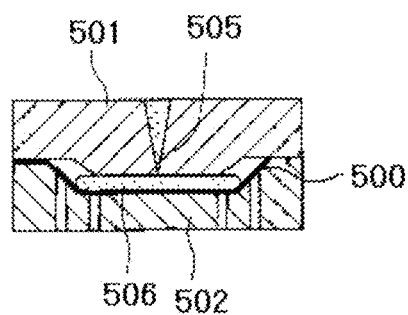
FIG. 11C is a process drawing illustrating one exemplary process for producing an article of the present invention by in-mold molding.
Figure 11D:
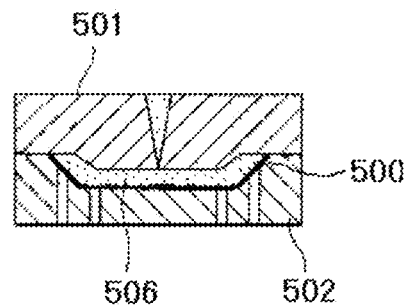
FIG. 11D is a process drawing illustrating one exemplary process for producing an article of the present invention by in-mold molding.

Subsequently, a molten molding material 504 is injected through a gate 505 of the first mold 501 toward the substrate made of a resin of the lipophilic laminate 500 and poured into a cavity which is formed by clamping the first mold 501 and the second mold 502 (FIG. 11C). Thus, the cavity is filled with the molten molding material 504 (FIG. 11D). After the completion of filling with the molten molding material 506, the molten molding material 504 is cooled to a predetermined temperature to solidify.

Figure 11E:
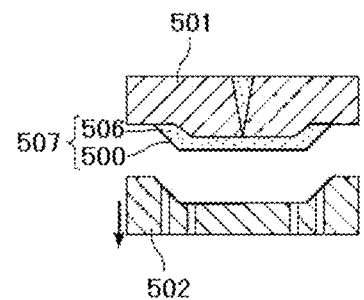
FIG. 11E is a process drawing illustrating one exemplary process for producing an article of the present invention by in-mold molding.
Figure 11F:
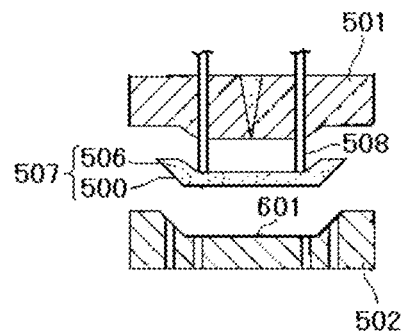
FIG. 11F is a process drawing illustrating one exemplary process for producing an article of the present invention by in-mold molding.

Then, the second mold 502 is moved to separate the first mold 501 and the second mold 502 (FIG. 11E). Thus, an article 507 in which the lipophilic laminate 500 is attached to a surface of the molding material 504 and which is molded into a desired shape by in-mold molding is obtained.

Finally, the resultant article 507 is pushed out from the first mold 501 with ejector pins 508.

In the case of using the overlay molding device, the article is produced in the following manner. This is a step of directly decorating a surface of a molding material with a lipophilic laminate. As an example, a TOM method (Three dimension Overlay Method) may be used. One exemplary method for producing an article of the present invention using the TOM method will now be described.

First, space within the device is partitioned by a hydrophilic laminate fixed to a fixing frame, and the partitioned spaces are vacuumed by sucking air in the spaces with, for example, a vacuum pump.

At this time, a molding material which has been injection molded is placed in one of the spaces in advance. Simultaneously with the vacuuming, the hydrophilic laminate is heated with an infrared heater to a predetermined temperature at which the hydrophilic laminate is softened. At the timing when the hydrophilic laminate is softened by heating, the hydrophilic laminate is brought into close contact with a three-dimensional geometry of the molding material under a vacuum atmosphere by feeding air to the space where the molding material is not placed. If necessary, the hydrophilic laminate may be further pressed onto the molding material by feeding compressed air to the space to which the air has been fed. After the hydrophilic laminate is attached onto the molding material, the resultant decorated molded product is removed from the fixing frame. This vacuum molding is typically performed at 80° C. to 200° C., preferably about 110° C. to about 160° C.

In the overlay molding, a sticky layer may be disposed on a surface of the hydrophilic laminate opposite to a hydrophilic surface in order to allow the hydrophilic laminate to adhere to the molding material. The sticky layer is not particularly limited and may be appropriately selected depending on the intended purpose. Examples of the sticky layer include acrylic adhesives and hot-melt adhesives. A method for forming the sticky layer is not particularly limited and may be appropriately selected depending on the intended purpose. For example, a method in which a surface of the substrate opposite to a surface on which the hydrophilic resin layer has been formed is coated with a coating liquid for a sticky layer to form the sticky layer may be used. Alternatively, a method in which a release sheet is coated with a coating liquid for a sticky layer to form the sticky layer and then the sticky layer on the release sheet is laminated on the substrate may be used.

EXAMPLES

The present invention will now be described in more detail with reference to Examples and Comparative Examples, but the present invention is not limited to the Examples. Note that, in the Examples, an average particle diameter of filler particles refers to a number average particle diameter.

In the Examples below, measurements and evaluations were performed in the following manner.

<Average Distance Between Convex Portions, Average Distance Between Concave Portions, Average Height of Convex Portions, Average Depth of Concave Portions, and Average Aspect Ratio>

In the Examples below, an average distance between convex portions, an average distance between concave portions, an average height of convex portions, an average depth of concave portions, and an average aspect ratio were determined in the following manner.

First, a surface of a lipophilic resin layer having convex portions or concave portions was observed by an atomic force microscope (AFM). From a cross-sectional profile of the resultant AFM image, a pitch of the convex portions or the concave portions, and a height of the convex portion or a depth of the concave portion were determined. This procedure was repeated at randomly selected 10 positions on the surface of the lipophilic resin layer to thereby determine the pitches P1, P2, . . . , P10 and the heights or the depths H1, H2, . . . , H10.

As used herein, the pitch of the convex portions refers to a distance between peaks of the convex portions, and the pitch of the concave portions refers to a distance between the deepest points of the concave portions. As used herein, the height of the convex portion refers to a height of the convex portion based on the lowest point of a valley portion between the convex portions, and the depth of the concave portion refers to a depth of the concave portion based on the highest point of a mountain portion between the concave portions.

Then, the pitches P1, P2, . . . , P10 and the heights or the depths H1, H2, . . . , H10 were simply averaged (arithmetically averaged) to determine the average distance (Pm) between convex or concave portions, and the average height of convex portions or the average depth of concave portions (Hm).

Based on the Pm and the Hm, an average aspect ratio (Hm/Pm) was determined.

<Measurement of Exposed Height a (μm) of Filler Particles>

Filler particles were observed by a scanning electron microscope (SEM) and a cross-sectional SEM image was taken adjacent to a peak height of the exposed portions of the filler particles. On a surface layer on which convex portions are formed, heights of the peaks of the convex portions were measured at 10 positions and averaged. A distance from the resultant average height to a peak of the filler particle was measured to thereby determine an exposed height a1 of the filler particle. Nine cross-sectional SEM image were taken for other filler particles in the same manner. Based on a total of 10 cross-sectional SEM images, the values of a1 measured on the SEM images were averaged to determine the value of a (μm).

<Measurement of Average Thickness L (μm) of Lipophilic Resin Layer>

A reflection spectrum of a sample was measured using a film thickness measurement system F20 (available from Filmetrics Japan, Inc.). Then, a film thickness was calculated from the reflection spectrum using a film thickness measurement software FILMEASURE (Ver. 2.4.3) (available from Filmetrics Japan, Inc.).

<Measurement of Rate of Exposed Portions of Filler Particles in a Surface of Lipophilic Resin Layer>

A lipophilic laminate of the present invention was cut into a 100 mm×100 mm sample. This sample was attached onto a black acrylic plate (ACRYLITE-502 BLACK, available from MITSUBISHI RAYON CO., LTD.) and observed by an optical microscope (VHX-900, available from KEYENCE CORPORATION) at a magnification of 700. An image (400 μm×300 μm) was taken focusing on a surface of the sample. This procedure was repeated at any 10 positions. Next, the resultant images were subjected to binarization processing so as to turn protruded portions of particles into black. An analytical software IMAGEJ 1.47 was used to calculate a rate of black portions relative to the entire image. An average of rates of the 10 positions was determined as the rate of exposed portions of the filler particles (surface occupation area of the filler particles).

<Oleic Acid Contact Angle>

An oleic acid contact angle was measured using a contact angle gauge PCA-1 (available from Kyowa Interface Science Co., Ltd.) under the following conditions.

Oleic acid was placed in a plastic syringe. A Teflon-coated needle was attached to the tip of the syringe. The oleic acid was dripped onto an evaluation surface.

Dripped amount of oleic acid: 1 μL
Measurement temperature: 25° C.

One hundred seconds after the oleic acid was dripped, contact angles were measured at any 10 positions on a surface of the lipophilic resin layer and averaged. The resultant average value was determined as the oleic acid contact angle.

A value of the oleic acid contact angle is preferably small, which achieves a good wiping-off property of deposited fingerprints with a finger, a tissue, or a cloth.

Fingerprint resistance can be evaluated by measuring the oleic acid contact angle.

<Measurement of Oleic Acid Contact Angle After Durability Test>

Hemp strings (HOHI 33 (diameter: about 3 mm), available from KOKUYO Co., Ltd.) were spread all over a surface of a 50 mm×150 mm sample which was cut from the lipophilic laminate of the present invention. The hemp strings are slid back and forth (sliding stroke: 3 cm, sliding frequency: 60 Hz) 10,000 times at a load of 750 gf/1 cm. Then, the oleic acid contact angle was measured as described above.

<Feel to Touch>

The lipophilic laminate of the present invention was cut into a 15 cm×30 cm sample. Any 10 positions, each having a size of 5 cm×5 cm, on the sample were touched with a finger in a circular manner to evaluate for slipperiness.

—Evaluation Criteria—

A: Nine positions or more had better slipperiness than that of Comparative Example 1.

B: Seven positions or more but less than 9 positions had better slipperiness than that of Comparative Example 1.

C: Five positions or more but less than 7 positions had better slipperiness than that of Comparative Example 1.

D: Four or less positions had better slipperiness than that of Comparative Example 1.

<Measurement of Feel to Touch After Durability Test>

Hemp strings (HOHI 33 (diameter: about 3 mm), available from KOKUYO Co., Ltd.) were spread all over a surface of a 15 mm×30 mm sample which was cut from the lipophilic laminate of the present invention. The hemp strings are slid back and forth (sliding stroke: 3 cm, sliding frequency: 60 Hz) 10,000 times at a load of 750 gf/1 cm. Then, a feel to the touch was measured as described above.

<Coefficient of Static Friction>

An automatic friction and wear tester TRIBOSTER TS501 (available from Kyowa Interface Science Co., Ltd.) was used to measure a coefficient of static friction under the following conditions.

Velocity: 50 mm/s
Load: 150 g
Moving distance: 30 mm
Coefficient of static friction: 0.02 s (initial) was used for calculation
Sliding top: A replica of a fingerprint of a human index finger was formed with silicone rubber.

The coefficient of static friction is an important criterion for evaluating the feel to the touch.

<Evaluation of Appearance>

A sample (10 cm×10 cm) was attached onto a black acrylic plate (ACRYLITE-502 BLACK, available from MITSUBISHI RAYON CO., LTD.). A face was reflected in the sample and evaluated according to the following criteria.

—Evaluation Criteria—

B: The face and its contour were able to be clearly seen.

C: A part of the face and its contour were able to be clearly seen, but other parts were distorted due to particles.

D: At least one of the face and the contour were not able to be clearly seen.

Example 1

<Production of Transfer Matrix (Glass Roll Matrix) Having Micro Convex Portions or Micro Concave Portions>

First, a glass roll matrix having an outer diameter of 126 mm was prepared. A resist layer was formed on the surface of the glass roll matrix in the following manner. A photoresist was diluted with thinner at a ratio 1/10 by mass. The resultant diluted resist was applied to a cylindrical surface of the glass roll matrix in an average thickness of about 70 nm by a dipping method to thereby form the resist layer. Next, the glass roll matrix was conveyed to the roll-matrix exposure device illustrated in FIG. 4, where the resist layer was exposed to light. Thus, a latent image lying in a spiral manner and forming a hexagonal lattice pattern between adjacent three rows of tracks was patterned on the resist layer. Specifically, a region where a hexagonal lattice exposure pattern is to be formed was irradiated with 0.50 mW/m laser beams to thereby form the hexagonal lattice exposure pattern.

Next, the resist layer on the glass roll matrix was developed to dissolve the resist layer in an exposed area. Specifically, an undeveloped glass roll matrix was mounted on a turntable of a developing device (not illustrated). A developing liquid was dripped on a surface of the glass roll matrix while the glass roll matrix was rotated along with the turntable to thereby develop the resist layer on the surface of the glass roll matrix. Thus, a resist glass matrix in which the resist layer had holes in a hexagonal lattice pattern was obtained.

Next, plasma etching was performed using a roll etching device under a $CHF_3$ gas atmosphere. As a result, only a region on which the resist layer is exposed corresponding to the hexagonal lattice pattern on the surface of the glass roll matrix was etched, but the other regions were not etched because the resist layer served as a mask. Thus, elliptical cone-shaped concave portions were formed in the glass roll matrix. In the etching, an amount (depth) of etching was adjusted by varying an etching time. Finally, the resist layer was removed completely by $O_2$ ashing to obtain a glass roll matrix having a concave hexagonal lattice pattern.

<Production of Lipophilic Laminate>

Next, the resultant roll matrix was used to produce a lipophilic laminate through UV imprint. Specifically, the lipophilic laminate was produced in the following manner.

As a substrate made of a resin, U40 (average thickness: 100 μm, polyethylene terephthalate (PET), available from Toray Industries, Inc.) was used.

The substrate made of a resin was coated with an ultraviolet curable resin composition for a lipophilic resin layer having the below-described composition so that an average thickness of the resultant lipophilic resin layer was 4 μm. Pressure was applied to the substrate made of a resin which had been coated with the ultraviolet curable resin composition for a lipophilic resin layer with being in close contact with the roll matrix produced as described above. Thus, micro convex portions were formed on a layer of the ultraviolet curable resin composition for a lipophilic resin layer. Then, the pressure was removed. One second after that, the lipophilic resin layer was irradiated with an ultraviolet ray at a dose of 1,000 mJ/cm$^2$ by a metal halide lamp from a side of the substrate made of a resin. Thus, the lipophilic resin layer was cured.

| -Ultraviolet curable resin composition for lipophilic resin layer- | |
| --- | --- |
| CN9006 (hexafunctional aliphatic urethane acrylate, available from Sartomer Company, Inc.) | 50 parts by mass |
| Trimethylolpropane triacrylate | 42 parts by mass |
| LUCIRIN TPO (available from BASF) (acylphosphine oxide photoinitiator) | 5 parts by mass |
| Acrylic beads (average particle diameter: 5 μm, available from Soken Chemical & Engineering Co., Ltd.) (PMMA (methyl polymethacrylate) particles) | 3 parts by mass |

Thus, a lipophilic laminate in which micro convex portions were formed and acrylic beads were exposed from a surface of a lipophilic resin layer was obtained.

A Tg of filler particles used is presented in Table 1.

The average distance between convex portions (or average distance between concave portions) (Pm), the average height of convex portions (or average depth of concave portions) (Hm), and the average aspect ratio (Hm/Pm) of the resultant lipophilic laminate were determined by the above-described methods. Results are presented in Table 2.

The average thickness L (μm) of the lipophilic resin layer is presented in Table 3.

The exposed height a of filler particles and the rate of exposed portions of filler particles of the resultant lipophilic laminate were determined by the above-described methods and the ratios a/L and a/X were calculated. Results are present in Table 3.

The resultant lipophilic laminate was evaluated for the oleic acid contact angle, the oleic acid contact angle after a durability test, the feel to the touch, the feel to the touch after a durability test, the coefficient of static friction, and the appearance. Results are presented in Table 4.

Figure 15:
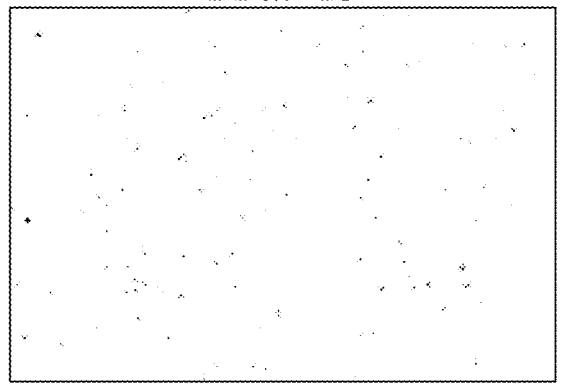
FIG. 15 is a photomicrograph illustrating a rate of exposed portions of filler particles relative to a surface of a lipophilic resin layer in a lipophilic laminate of Example 1.

A photomicrograph indicating the rate of exposed portions of filler particles relative to the surface of the lipophilic resin layer of the resultant lipophilic laminate is presented in FIG. 15.

Example 2

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
| --- | --- |
| CN9006 (hexafunctional aliphatic urethane acrylate, available from Sartomer Company, Inc.) | 50 parts by mass |
| Trimethylolpropane triacrylate | 42 parts by mass |
| LUCIRIN TPO (available from BASF) (acylphosphine oxide photoinitiator) | 5 parts by mass |
| Acrylic beads (average particle diameter: 10 μm, available from Soken Chemical & Engineering Co., Ltd.) (PMMA (methyl polymethacrylate) particles) | 3 parts by mass |

The resultant lipophilic laminate was measured and evaluated in the same manner as in Example 1. Results are presented in Tables 2 to 4.

Figure 16:
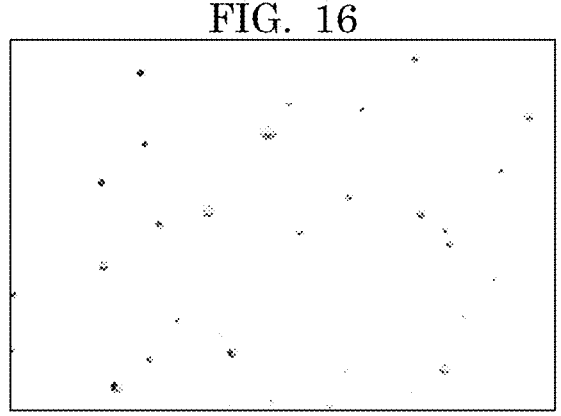
FIG. 16 is a photomicrograph illustrating a rate of exposed portions of filler particles relative to a surface of a lipophilic resin layer in a lipophilic laminate of Example 2.

A photomicrograph indicating the rate of exposed portions of filler particles relative to the surface of the lipophilic resin layer of the resultant lipophilic laminate is presented in FIG. 16.

Example 3

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
| --- | --- |
| CN9006 (hexafunctional aliphatic urethane acrylate, available from Sartomer Company, Inc.) | 50 parts by mass |
| Trimethylolpropane triacrylate | 44 parts by mass |
| LUCIRIN TPO (available from BASF) (acylphosphine oxide photoinitiator) | 5 parts by mass |
| TOSPEARL 120 (silicone particles, average particle diameter: 2 μm, available from Momentive Performance Materials Inc.) | 1 part by mass |

The resultant lipophilic laminate was measured and evaluated in the same manner as in Example 1. Results are presented in Tables 2 to 4.

Figure 17:
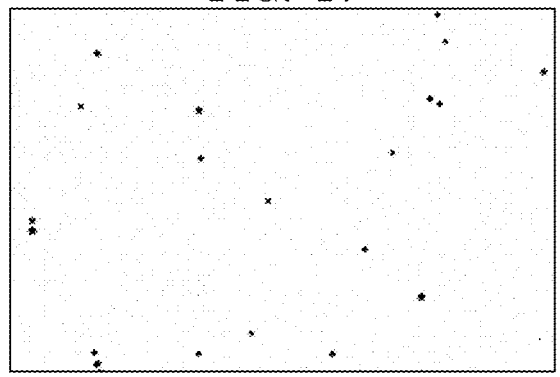
FIG. 17 is a photomicrograph illustrating a rate of exposed portions of filler particles relative to a surface of a lipophilic resin layer in a lipophilic laminate of Example 3.

A photomicrograph indicating the rate of exposed portions of filler particles relative to the surface of the lipophilic resin layer of the resultant lipophilic laminate is presented in FIG. 17.

Example 4

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
| --- | --- |
| CN9006 (hexafunctional aliphatic urethane acrylate, available from Sartomer Company, Inc.) | 50 parts by mass |
| Trimethylolpropane triacrylate | 44 parts by mass |
| LUCIRIN TPO (available from BASF) (acylphosphine oxide photoinitiator) | 5 parts by mass |
| TOSPEARL 145 (silicone particles, average particle diameter: 4.5 μm, available from Momentive Performance Materials Inc.) | 1 part by mass |

The resultant lipophilic laminate was measured and evaluated in the same manner as in Example 1. Results are presented in Tables 2 to 4.

Figure 18:
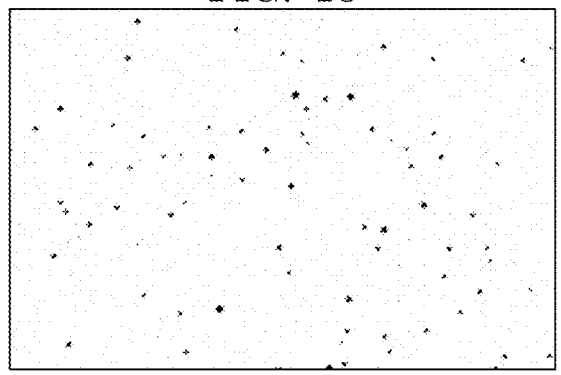
FIG. 18 is a photomicrograph illustrating a rate of exposed portions of filler particles relative to a surface of a lipophilic resin layer in a lipophilic laminate of Example 4.

A photomicrograph indicating the rate of exposed portions of filler particles relative to the surface of the lipophilic resin layer of the resultant lipophilic laminate is presented in FIG. 18.

Example 5

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
|---|---|
| CN9006 (hexafunctional aliphatic urethane acrylate, available from Sartomer Company, Inc.) | 50 parts by mass |
| Trimethylolpropane triacrylate | 44 parts by mass |
| LUCIRIN TPO (available from BASF) (acylphosphine oxide photoinitiator) | 5 parts by mass |
| TOSPEARL 1110 (silicone particles, average particle diameter: 11 μm, available from Momentive Performance Materials Inc.) | 1 part by mass |

The resultant lipophilic laminate was measured and evaluated in the same manner as in Example 1. Results are presented in Tables 2 to 4.

Figure 19:
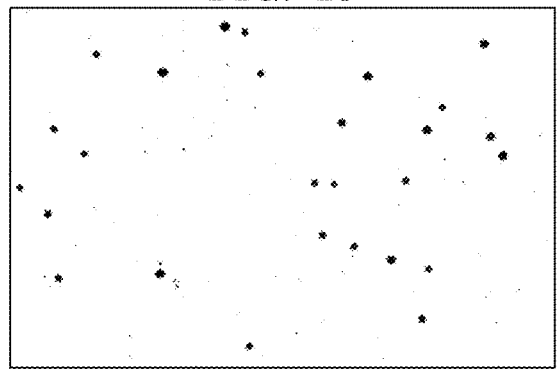
FIG. 19 is a photomicrograph illustrating a rate of exposed portions of filler particles relative to a surface of a lipophilic resin layer in a lipophilic laminate of Example 5.

A photomicrograph indicating the rate of exposed portions of filler particles relative to the surface of the lipophilic resin layer of the resultant lipophilic laminate is presented in FIG. 19.

Example 6

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
|---|---|
| CN9006 (hexafunctional aliphatic urethane acrylate, available from Sartomer Company, Inc.) | 50 parts by mass |
| Trimethylolpropane triacrylate | 42 parts by mass |
| LUCIRIN TPO (available from BASF) (acylphosphine oxide photoinitiator) | 5 parts by mass |
| SP10 (nylon particles, average particle diameter: 10 μm, available from Toray Industries, Inc.) | 3 parts by mass |

The resultant lipophilic laminate was measured and evaluated in the same manner as in Example 1. Results are presented in Tables 2 to 4.

Figure 20:
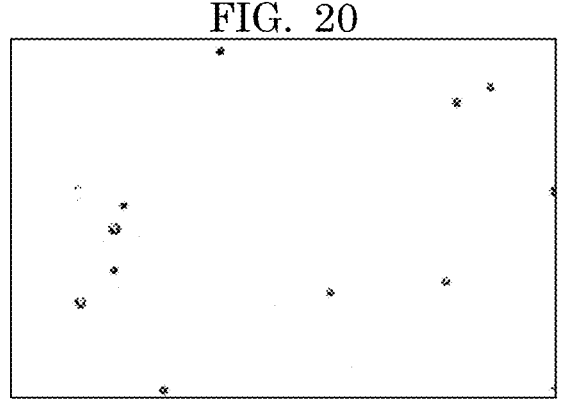
FIG. 20 is a photomicrograph illustrating a rate of exposed portions of filler particles relative to a surface of a lipophilic resin layer in a lipophilic laminate of Example 6.

A photomicrograph indicating the rate of exposed portions of filler particles relative to the surface of the lipophilic resin layer of the resultant lipophilic laminate is presented in FIG. 20.

Example 7

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
|---|---|
| CN9006 (hexafunctional aliphatic urethane acrylate, available from Sartomer Company, Inc.) | 50 parts by mass |
| Trimethylolpropane triacrylate | 42 parts by mass |
| LUCIRIN TPO (available from BASF) (acylphosphine oxide photoinitiator) | 5 parts by mass |
| U-600 (available from Negami Chemical Industrial Co., Ltd.) (urethane particles, average particle diameter: 10 μm) | 3 parts by mass |

The resultant lipophilic laminate was measured and evaluated in the same manner as in Example 1. Results are presented in Tables 2 to 4.

Figure 21:
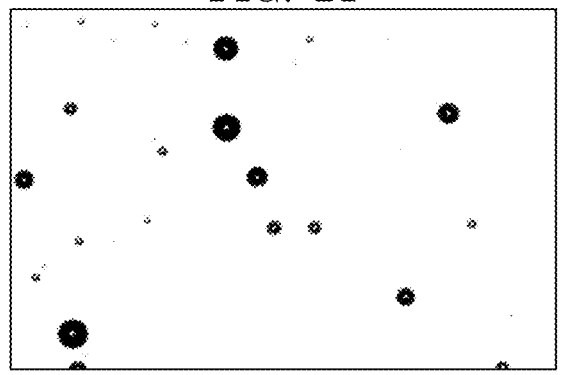
FIG. 21 is a photomicrograph illustrating a rate of exposed portions of filler particles relative to a surface of a lipophilic resin layer in a lipophilic laminate of Example 7.

A photomicrograph indicating the rate of exposed portions of filler particles relative to the surface of the lipophilic resin layer of the resultant lipophilic laminate is presented in FIG. 21.

Example 8

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
|---|---|
| CN9006 (hexafunctional aliphatic urethane acrylate, available from Sartomer Company, Inc.) | 50 parts by mass |
| Trimethylolpropane triacrylate | 42 parts by mass |
| LUCIRIN TPO (available from BASF) (acylphosphine oxide photoinitiator) | 5 parts by mass |
| Acrylic beads (average particle diameter: 1 μm, available from Soken Chemical & Engineering Co., Ltd.) (PMMA (methyl polymethacrylate) particles) | 3 parts by mass |

The resultant lipophilic laminate was measured and evaluated in the same manner as in Example 1. Results are presented in Tables 2 to 4.

Example 9

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
|---|---|
| CN9006 (hexafunctional aliphatic urethane acrylate, available from Sartomer Company, Inc.) | 50 parts by mass |
| Trimethylolpropane triacrylate | 42 parts by mass |
| LUCIRIN TPO (available from BASF) (acylphosphine oxide photoinitiator) | 5 parts by mass |
| Acrylic beads (average particle diameter: 50 μm, available from Soken Chemical & Engineering Co., Ltd.) (PMMA (methyl polymethacrylate) particles) | 3 parts by mass |

The resultant lipophilic laminate was measured and evaluated in the same manner as in Example 1. Results are presented in Tables 2 to 4.

Example 10

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
|---|---|
| CN9006 (hexafunctional aliphatic urethane acrylate, available from Sartomer Company, Inc.) | 50 parts by mass |
| Trimethylolpropane triacrylate | 42 parts by mass |

-continued

-Ultraviolet curable resin composition for lipophilic resin layer-

| | |
|---|---|
| LUCIRIN TPO (available from BASF) (acylphosphine oxide photoinitiator) | 5 parts by mass |
| Acrylic beads (average particle diameter: 100 μm, available from Soken Chemical & Engineering Co., Ltd.) (PMMA (methyl polymethacrylate) particles) | 3 parts by mass |

The resultant lipophilic laminate was measured and evaluated in the same manner as in Example 1. Results are presented in Tables 2 to 4.

Example 11

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

-Ultraviolet curable resin composition for lipophilic resin layer-

| | |
|---|---|
| CN9006 (hexafunctional aliphatic urethane acrylate, available from Sartomer Company, Inc.) | 50 parts by mass |
| Trimethylolpropane triacrylate | 42 parts by mass |
| LUCIRIN TPO (available from BASF) (acylphosphine oxide photoinitiator) | 5 parts by mass |
| Silica beads ADELITE AT (silica particles, average particle diameter: 10 μm, available from ADEKA CORPORATION) | 3 parts by mass |

The resultant lipophilic laminate was measured and evaluated in the same manner as in Example 1. Results are presented in Tables 2 to 4.

Example 12

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

-Ultraviolet curable resin composition for lipophilic resin layer-

| | |
|---|---|
| CN9006 (hexafunctional aliphatic urethane acrylate, available from Sartomer Company, Inc.) | 50 parts by mass |
| Trimethylolpropane triacrylate | 42 parts by mass |
| LUCIRIN TPO (available from BASF) (acylphosphine oxide photoinitiator) | 5 parts by mass |
| Titania beads HT0110 (available from TOHO TITANIUM CO., LTD.) (titania particles, average particle diameter: 10 μm,) | 3 parts by mass |

The resultant lipophilic laminate was measured and evaluated in the same manner as in Example 1. Results are presented in Tables 2 to 4.

Example 13

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

-Ultraviolet curable resin composition for lipophilic resin layer-

| | |
|---|---|
| CN9006 (hexafunctional aliphatic urethane acrylate, available from Sartomer Company, Inc.) | 35 parts by mass |
| Trimethylolpropane triacrylate | 30 parts by mass |
| LUCIRIN TPO (available from BASF) (acylphosphine oxide photoinitiator) | 5 parts by mass |
| U-600 (available from Negami Chemical Industrial Co., Ltd.) (urethane particles, average particle diameter: 10 μm) | 30 parts by mass |

The resultant lipophilic laminate was measured and evaluated in the same manner as in Example 1. Results are presented in Tables 2 to 4.

Example 14

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

-Ultraviolet curable resin composition for lipophilic resin layer-

| | |
|---|---|
| CN9006 (hexafunctional aliphatic urethane acrylate, available from Sartomer Company, Inc.) | 40 parts by mass |
| Trimethylolpropane triacrylate | 40 parts by mass |
| LUCIRIN TPO (available from BASF) (acylphosphine oxide photoinitiator) | 5 parts by mass |
| U-600 (available from Negami Chemical Industrial Co., Ltd.) (urethane particles, average particle diameter: 10 μm) | 15 parts by mass |

The resultant lipophilic laminate was measured and evaluated in the same manner as in Example 1. Results are presented in Tables 2 to 4.

Example 15

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

-Ultraviolet curable resin composition for lipophilic resin layer-

| | |
|---|---|
| CN9006 (hexafunctional aliphatic urethane acrylate, available from Sartomer Company, Inc.) | 50 parts by mass |
| Trimethylolpropane triacrylate | 44.9 parts by mass |
| LUCIRIN TPO (available from BASF) (acylphosphine oxide photoinitiator) | 5 parts by mass |
| U-600 (available from Negami Chemical Industrial Co., Ltd.) (urethane particles, average particle diameter: 10 μm) | 0.1 parts by mass |

The resultant lipophilic laminate was measured and evaluated in the same manner as in Example 1. Results are presented in Tables 2 to 4.

Example 16

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
|---|---|
| CN9006 (hexafunctional aliphatic urethane acrylate, available from Sartomer Company, Inc.) | 50 parts by mass |
| Trimethylolpropane triacrylate | 44.5 parts by mass |
| LUCIRIN TPO (available from BASF) (acylphosphine oxide photoinitiator) | 5 parts by mass |
| U-600 (available from Negami Chemical Industrial Co., Ltd.) (urethane particles, average particle diameter: 10 μm) | 0.5 parts by mass |

The resultant lipophilic laminate was measured and evaluated in the same manner as in Example 1. Results are presented in Tables 2 to 4.

Example 17

A lipophilic laminate was obtained in the same manner as in Example 7, except that the exposure pattern of the resist layer in production of the glass roll matrix was changed.
The resultant lipophilic laminate was measured and evaluated in the same manner as in Example 1. Results are presented in Tables 2 to 4.

Example 18

A lipophilic laminate was obtained in the same manner as in Example 7, except that the exposure pattern of the resist layer in production of the glass roll matrix was changed.
The resultant lipophilic laminate was measured and evaluated in the same manner as in Example 1. Results are presented in Tables 2 to 4.

Example 19

A lipophilic laminate was obtained in the same manner as in Example 7, except that the exposure pattern of the resist layer in production of the glass roll matrix was changed.
The resultant lipophilic laminate was measured and evaluated in the same manner as in Example 1. Results are presented in Tables 2 to 4.

Example 20

<Production of Transfer Matrix (Plate Matrix) Having Micro Convex Portions or Micro Concave Portions>

The device illustrated in FIG. 8 was used as a laser processing device. IFRIT (trade name; available from Cyber Laser Inc.) was used as the laser main-body 340. A laser wavelength was set to 800 nm, a repetitive frequency was set to 1,000 Hz, and a pulse width was set to 220 fs.
First, a matrix was produced by coating a surface of a plate substrate (SUS) with DLC (Diamond-Like Carbon) by a spattering method. Next, micro concave portions were formed on a DLC-coated surface of the matrix using the laser processing device. At this time, the matrix was laser-processed under the laser processing conditions described in Table 1. Thus, a plate matrix for transferring a geometry was obtained. Note that, the matrix was a rectangle having a size of 2 cm×2 cm.

<Production of Lipophilic Laminate>

Next, the plate matrix produced as described above was used to produce a lipophilic laminate through UV imprint. Specifically, the lipophilic laminate was produced in the following manner.

A lipophilic laminate was produced in the same manner as in Example 7, except that the roll matrix was changed to the plate matrix produced as described above.
The thus-produced lipophilic laminate was measured and evaluated in the same manner as in Example 1. Results are presented in Tables 2 to 4.

Example 21

A lipophilic laminate was obtained in the same manner as in Example 20, except that laser irradiation conditions for producing the plate matrix were changed as described in Table 1.
The resultant lipophilic laminate was measured and evaluated in the same manner as in Example 1. Results are presented in Tables 2 to 4.

Comparative Example 1

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

| -Ultraviolet curable resin composition for lipophilic resin layer- | |
|---|---|
| CN9006 (hexafunctional aliphatic urethane acrylate, available from Sartomer Company, Inc.) | 50 parts by mass |
| Trimethylolpropane triacrylate | 45 parts by mass |
| LUCIRIN TPO (available from BASF) (acylphosphine oxide photoinitiator) | 5 parts by mass |

The resultant lipophilic laminate was measured and evaluated in the same manner as in Example 1. Results are presented in Tables 2 to 4.

Figure 22:
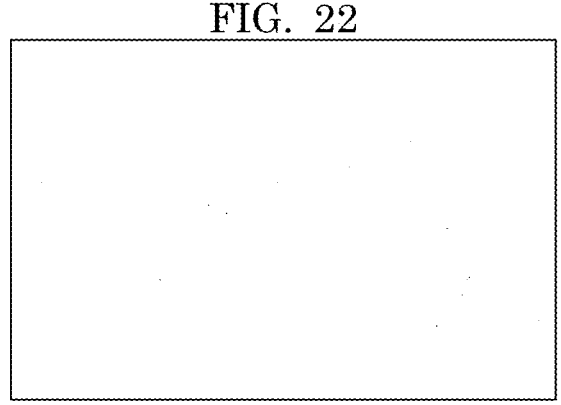
FIG. 22 is a photomicrograph illustrating a rate of exposed portions of filler particles relative to a surface of a lipophilic resin layer in a lipophilic laminate of Comparative Example 1.

A microphotograph indicating the rate (0%) of the exposed portions of the filler particles on the surface of the lipophilic resin layer of the resultant lipophilic laminate is presented in FIG. 22.

Comparative Example 2

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

TABLE 1

| | | Laser processing conditions | | | | | | | |
|---|---|---|---|---|---|---|---|---|---|
| | Matrix material | Wavelength (nm) | Polarization | P (mW) | Lx (μm) Width | Ly (μm) Length | v (mm/s) | N | F (J/cm$^2$) |
| Ex. 20 | DLC | 800 | Linear | 96 | 300 | 160 | 8 | 20 | 0.2 |
| Ex. 21 | DLC | 800 | Linear | 96 | 300 | 160 | 5.33 | 30 | 0.2 |

-Ultraviolet curable resin composition for lipophilic resin layer-

| | |
|---|---|
| CN9006 (hexafunctional aliphatic urethane acrylate, available from Sartomer Company, Inc.) | 50 parts by mass |
| Trimethylolpropane triacrylate | 44.95 parts by mass |
| LUCIRIN TPO (available from BASF) (acylphosphine oxide photoinitiator) | 5 parts by mass |
| U-600 (available from Negami Chemical Industrial Co., Ltd.) (urethane particles, average particle diameter: 10 μm) | 0.05 parts by mass |

The resultant lipophilic laminate was measured and evaluated in the same manner as in Example 1. Results are presented in Tables 2 to 4.

Comparative Example 3

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

-Ultraviolet curable resin composition for lipophilic resin layer-

| | |
|---|---|
| CN9006 (hexafunctional aliphatic urethane acrylate, available from Sartomer Company, Inc.) | 30 parts by mass |
| Trimethylolpropane triacrylate | 25 parts by mass |
| LUCIRIN TPO (available from BASF) (acylphosphine oxide photoinitiator) | 5 parts by mass |
| U-600 (available from Negami Chemical Industrial Co., Ltd.) (urethane particles, average particle diameter: 10 μm) | 40 parts by mass |

The resultant lipophilic laminate was measured and evaluated in the same manner as in Example 1. Results are presented in Tables 2 to 4.

Comparative Example 4

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

-Ultraviolet curable resin composition for lipophilic resin layer-

| | |
|---|---|
| CN9006 (hexafunctional aliphatic urethane acrylate, available from Sartomer Company, Inc.) | 50 parts by mass |
| Trimethylolpropane triacrylate | 42 parts by mass |
| LUCIRIN TPO (available from BASF) (acylphosphine oxide photoinitiator) | 5 parts by mass |
| Acrylic beads (average particle diameter: 0.4 μm, available from Soken Chemical & Engineering Co., Ltd.) (PMMA (methyl polymethacrylate) particles) | 3 parts by mass |

The resultant lipophilic laminate was measured and evaluated in the same manner as in Example 1. Results are presented in Tables 2 to 4.

Comparative Example 5

A lipophilic laminate was obtained in the same manner as in Example 1, except that the composition of the ultraviolet curable resin composition for a lipophilic resin layer was changed as described below and the average thickness of the lipophilic resin layer was changed as described in Table 3.

-Ultraviolet curable resin composition for lipophilic resin layer-

| | |
|---|---|
| CN9006 (hexafunctional aliphatic urethane acrylate, available from Sartomer Company, Inc.) | 50 parts by mass |
| Trimethylolpropane triacrylate | 42 parts by mass |
| LUCIRIN TPO (available from BASF) (acylphosphine oxide photoinitiator) | 5 parts by mass |
| Acrylic beads (average particle diameter: 200 μm, available from Soken Chemical & Engineering Co., Ltd.) (PMMA (methyl polymethacrylate) particles) | 3 parts by mass |

The resultant lipophilic laminate was measured and evaluated in the same manner as in Example 1. Results are presented in Tables 2 to 4.

TABLE 2

| | | | (Lipophilic) resin layer | | | Filler particles | | | |
|---|---|---|---|---|---|---|---|---|---|
| | Substrate Kind | Matrix Kind | Pm (nm) | Hm (nm) | Hm/Pm | Kind | Tg (° C.) | Average particle diameter (μm) | Content (% by mass) |
| Ex. 1 | PET | Roll | 270 | 60 | 0.22 | PMMA | 70 | 5 | 3 |
| Ex. 2 | PET | Roll | 270 | 60 | 0.22 | PMMA | 70 | 10 | 3 |
| Ex. 3 | PET | Roll | 270 | 60 | 0.22 | Silicone | >150 | 2 | 1 |
| Ex. 4 | PET | Roll | 270 | 60 | 0.22 | Silicone | >150 | 4.5 | 1 |
| Ex. 5 | PET | Roll | 270 | 60 | 0.22 | Silicone | >150 | 11 | 1 |
| Ex. 6 | PET | Roll | 270 | 60 | 0.22 | Nylon | 50 | 10 | 3 |
| Ex. 7 | PET | Roll | 270 | 60 | 0.22 | Urethane | 35 | 10 | 3 |
| Ex. 8 | PET | Roll | 270 | 60 | 0.22 | PMMA | 70 | 1 | 3 |
| Ex. 9 | PET | Roll | 270 | 60 | 0.22 | PMMA | 70 | 50 | 3 |
| Ex. 10 | PET | Roll | 270 | 60 | 0.22 | PMMA | 70 | 100 | 3 |
| Ex. 11 | PET | Roll | 270 | 60 | 0.22 | Silica | >150 | 10 | 3 |
| Ex. 12 | PET | Roll | 270 | 60 | 0.22 | Titania | >150 | 10 | 3 |
| Ex. 13 | PET | Roll | 270 | 60 | 0.22 | Urethane | 35 | 10 | 30 |
| Ex. 14 | PET | Roll | 270 | 60 | 0.22 | Urethane | 35 | 10 | 15 |
| Ex. 15 | PET | Roll | 270 | 60 | 0.22 | Urethane | 35 | 10 | 0.1 |
| Ex. 16 | PET | Roll | 270 | 60 | 0.22 | Urethane | 35 | 10 | 0.5 |
| Ex. 17 | PET | Roll | 500 | 60 | 0.12 | Urethane | 35 | 10 | 3 |
| Ex. 18 | PET | Roll | 500 | 500 | 1.00 | Urethane | 35 | 10 | 3 |
| Ex. 19 | PET | Roll | 270 | 20 | 0.07 | Urethane | 35 | 10 | 3 |
| Ex. 20 | PET | Plate | 50 | 39 | 0.78 | Urethane | 35 | 10 | 3 |

TABLE 2-continued

|  | Substrate Kind | Matrix Kind | (Lipophilic) resin layer | | | Filler particles | | | |
|---|---|---|---|---|---|---|---|---|---|
|  |  |  | Pm (nm) | Hm (nm) | Hm/Pm | Kind | Tg (° C.) | Average particle diameter (μm) | Content (% by mass) |
| Ex. 21 | PET | Plate | 10 | 21 | 2.10 | Urethane | 35 | 10 | 3 |
| Comp. Ex. 1 | PET | Roll | 270 | 60 | 0.22 | — | — | — | — |
| Comp. Ex. 2 | PET | Roll | 270 | 60 | 0.22 | Urethane | 35 | 10 | 0.05 |
| Comp. Ex. 3 | PET | Roll | 270 | 60 | 0.22 | Urethane | 35 | 10 | 40 |
| Comp. Ex. 4 | PET | Roll | 270 | 60 | 0.22 | PMMA | 70 | 0.4 | 3 |
| Comp. Ex. 5 | PET | Roll | 270 | 60 | 0.22 | PMMA | 70 | 200 | 3 |

TABLE 3

| | Exposed height of filler particles a (μm) | Average thickness of lipophilic resin layer L (μm) | a/L | a/X | Rate of exposed portions of filler particles (%) |
|---|---|---|---|---|---|
| Ex. 1 | 1 | 4 | 0.250 | 17 | 0.13 |
| Ex. 2 | 2 | 8 | 0.250 | 33 | 0.19 |
| Ex. 3 | 0.1 | 1.9 | 0.053 | 2 | 0.30 |
| Ex. 4 | 0.1 | 4.4 | 0.023 | 2 | 0.53 |
| Ex. 5 | 0.1 | 10.9 | 0.009 | 2 | 0.65 |
| Ex. 6 | 2 | 8 | 0.250 | 33 | 0.22 |
| Ex. 7 | 4 | 6 | 0.667 | 67 | 1.75 |
| Ex. 8 | 0.1 | 0.9 | 0.111 | 2 | 0.10 |
| Ex. 9 | 10 | 40 | 0.250 | 167 | 1.30 |
| Ex. 10 | 30 | 70 | 0.429 | 500 | 0.10 |
| Ex. 11 | 0.1 | 9.9 | 0.010 | 2 | 0.51 |
| Ex. 12 | 0.1 | 9.9 | 0.010 | 2 | 0.51 |
| Ex. 13 | 4 | 6 | 0.667 | 67 | 0.2 |
| Ex. 14 | 4 | 6 | 0.667 | 67 | 1.1 |
| Ex. 15 | 4 | 6 | 0.667 | 67 | 0.10 |
| Ex. 16 | 4 | 6 | 0.667 | 67 | 0.40 |
| Ex. 17 | 4 | 6 | 0.667 | 67 | 1.75 |
| Ex. 18 | 4 | 6 | 0.667 | 8 | 1.75 |
| Ex. 19 | 4 | 6 | 0.667 | 200 | 1.75 |
| Ex. 20 | 4 | 6 | 0.667 | 103 | 1.75 |
| Ex. 21 | 4 | 6 | 0.667 | 190 | 1.75 |
| Comp. Ex. 1 | — | 0.5 | — | — | 0.0 |
| Comp. Ex. 2 | 4 | 6 | 0.667 | 67 | 0.03 |
| Comp. Ex. 3 | 0 | 10 | 0.000 | 67 | 0.07 |
| Comp. Ex. 4 | 0 | 0.5 | 0.000 | 0.00 | 0.00 |
| Comp. Ex. 5 | — | — | — | — | — |

TABLE 4

| | Oleic acid contact angle (°) | Oleic acid contact angle after durability test (°) | Coefficient of static friction | Feel to touch | Feel to touch after durability test | Appearance |
|---|---|---|---|---|---|---|
| Ex. 1 | 1.8 | 1.8 | 0.58 | A | A | B |
| Ex. 2 | 1.8 | 1.8 | 0.58 | A | A | B |
| Ex. 3 | 1.8 | 1.8 | 0.59 | A | A | B |
| Ex. 4 | 1.8 | 1.8 | 0.57 | A | A | B |
| Ex. 5 | 1.8 | 1.8 | 0.59 | B | B | B |
| Ex. 6 | 1.8 | 1.8 | 0.56 | A | A | B |
| Ex. 7 | 1.8 | 1.8 | 0.57 | A | A | B |
| Ex. 8 | 1.8 | 1.8 | 0.59 | A | A | B |
| Ex. 9 | 1.8 | 1.8 | 0.60 | A | A | B |
| Ex. 10 | 1.8 | 2.5 | 0.61 | C | C | C |
| Ex. 11 | 1.8 | 1.8 | 0.60 | A | A | B |
| Ex. 12 | 1.8 | 1.8 | 0.59 | A | A | B |
| Ex. 13 | 1.8 | 1.8 | 0.60 | A | A | B |
| Ex. 14 | 1.8 | 1.8 | 0.55 | A | A | B |
| Ex. 15 | 1.8 | 1.8 | 0.61 | A | A | B |
| Ex. 16 | 1.8 | 1.8 | 0.60 | A | A | B |
| Ex. 17 | 1.5 | 1.8 | 0.56 | A | A | B |
| Ex. 18 | 4 | 4 | 0.56 | A | A | B |
| Ex. 19 | 3 | 3 | 0.56 | A | A | B |
| Ex. 20 | 2.3 | 2.3 | 0.56 | A | A | B |
| Ex. 21 | 3 | 3 | 0.56 | A | A | B |
| Comp. Ex. 1 | 1.8 | 5 | 0.63 | D | D | B |
| Comp. Ex. 2 | 1.8 | 3 | 0.63 | D | D | B |
| Comp. Ex. 3 | 1.8 | 4 | 0.62 | D | D | B |
| Comp. Ex. 4 | 1.8 | 5 | 0.63 | D | D | B |
| Comp. Ex. 5 | — | — | — | D (Film was not formed) | — | — |

The lipophilic laminates of Examples 1 to 21 were satisfactory in excellent fingerprint resistance durable for long-term usage and a pleasant feel to the touch. It was confirmed that exposure of the filler particles improved the fingerprint resistance and the feel to the touch, but did not adversely affect on appearance.

Meanwhile, Comparative Example 1, in which the filler particles were not exposed, and Comparative Example 4, in which the filler particles were contained but not exposed, were deteriorated in the oleic acid contact angle after a durability test, unsatisfactory in the fingerprint resistance, and had an unpleasant feel to the touch.

Comparative Example 2, in which only a small amount of the filler particles were contained and the rate of the exposed portions was insufficient, was deteriorated in the oleic acid contact angle after a durability test, unsatisfactory in the fingerprint resistance, and had an unpleasant feel to the touch.

For Comparative Example 3, when it is attempted to include a larger amount of the filler particles in the lipophilic resin layer, a certain degree of average thickness L of the lipophilic resin layer needs to be ensured for film formation. When a film having the above average thickness L was formed, the exposed portions of the filler particles were decreased, resulting in a deteriorated oleic acid contact angle after a durability test, unsatisfactory fingerprint resistance, and an unpleasant feel to the touch.

Comparative Examples 5, which contained the filler particles having the average particle diameter of 200 μm, was not able to form a film. Therefore, the result was not obtained.

INDUSTRIAL APPLICABILITY

A lipophilic laminate of the present invention is able to be used with being attached on touch panels, smartphones, covers for smartphones, tablet PCs, home electric appliances, cosmetic containers, and accessories. A lipophilic laminate of the present invention is able to be used for automobile interior part surfaces (e.g., door trims, instrument panels, center cluster/center console panels, shift knobs, members around a shift knob, and steering emblems) and automobile exterior part surfaces (e.g., door handles) utilizing in-mold molding, insert molding, or overlay molding.

REFERENCE SIGNS LIST

61 Filler particles
62 Lipophilic resin layer
63 Substrate
211 Substrate made of resin
212 Lipophilic resin layer
231 Roll matrix
232 Structure
236 Uncured resin layer
237 Active energy ray
311 Substrate made of resin
312 Lipophilic resin layer
331 Plate matrix
332 Structure
333 Uncured resin layer
334 Active energy ray

The invention claimed is:

1. A lipophilic laminate comprising:
   a substrate; and
   a lipophilic resin layer on the substrate,
   wherein the lipophilic resin layer has micro convex portions or micro concave portions in a surface thereof,
   wherein the lipophilic resin layer includes filler particles,
   wherein parts of the filler particles are exposed from the lipophilic resin layer,
   wherein a rate of exposed portions of the filler particles relative to the surface of the lipophilic resin layer is 0.1% or more,
   wherein the filler particles include at least one of organic particles and silicone particles,
   wherein thickness of the lipophilic resin layer is 0.1 μm to 100 μm,
   wherein the filler particles are exposed from the surface of the lipophilic resin layer by a height a (μm) of 0.1 μm to 29 μm,
   wherein a ratio a/L is 0.01 to 0.67 where a (um) denotes an exposed height of the filler particles exposed from the surface of the lipophilic resin layer and L (μm) denotes an average thickness of the lipophilic resin layer, and
   wherein a ratio a/X is 2 to 200 where a (μm) denotes an exposed height of the filler particles exposed from the surface of the lipophilic resin layer and X (μm) denotes an average height of the micro convex portions or an average depth of the micro concave portions in the lipophilic resin layer.

2. The lipophilic laminate according to claim 1, wherein the lipophilic resin layer includes 1% by mass to 30% by mass of filler particles having an average particle diameter of less than 200 μm.

3. The lipophilic laminate according to claim 1, wherein the number average particle diameter of the filler particles is 1 μm to 100 μm.

4. The lipophilic laminate according to claim 1, wherein an amount of the filler particles contained in the lipophilic resin layer is 1% by mass to 10% by mass.

5. A method for producing the lipophilic laminate according to claim 1, the method comprising:
   coating a substrate with an active-energy-ray curable resin-composition including filler particles to form an uncured resin layer; and
   forming a lipophilic resin layer by applying pressure to the uncured resin layer with being in close contact with a transfer matrix having micro convex portions or micro concave portions to form a geometry of the micro convex portions or the micro concave portions in the uncured resin layer, removing the pressure, and curing the uncured resin layer by irradiating the uncured resin layer with an active energy ray with keeping the geometry of the micro convex portions or the micro concave portions to thereby transfer the micro convex portions or the micro concave portions.

6. The method for producing the lipophilic laminate according to claim 5, wherein the micro convex portions or the micro concave portions in the transfer matrix are formed by etching a surface of the transfer matrix with a photoresist having a predetermined geometry pattern and serving as a protective film.

7. The method for producing the lipophilic laminate according to claim 5, wherein the micro convex portions or the micro concave portions in the transfer matrix are formed by irradiating a surface of the transfer matrix with laser to laser-process the transfer matrix.

8. An article comprising the lipophilic laminate according to claim 1 in a surface thereof.

* * * * *